US009002850B2

(12) United States Patent
Bandyopadhyay et al.

(10) Patent No.: US 9,002,850 B2
(45) Date of Patent: Apr. 7, 2015

(54) BALANCING CACHING LOAD IN A PEER-TO-PEER BASED NETWORK FILE SYSTEM

(71) Applicant: Toshiba Corporation, Tokyo (JP)

(72) Inventors: Somenath Bandyopadhyay, Santa Clara, CA (US); Abhijeet P. Gole, Cupertino, CA (US); Jayesh Bhatt, Sunnyvale, CA (US)

(73) Assignee: Toshiba Corporation, Tokyo (JP)

( * ) Notice: Subject to any disclaimer, the term of this patent is extended or adjusted under 35 U.S.C. 154(b) by 121 days.

(21) Appl. No.: 13/914,512

(22) Filed: Jun. 10, 2013

(65) Prior Publication Data

US 2013/0290467 A1    Oct. 31, 2013

Related U.S. Application Data

(63) Continuation of application No. 13/220,200, filed on Aug. 29, 2011, now Pat. No. 8,463,788.

(60) Provisional application No. 61/380,010, filed on Sep. 3, 2010.

(51) Int. Cl.
*G06F 17/30* (2006.01)
*H04L 29/08* (2006.01)

(52) U.S. Cl.
CPC ........ *H04L 67/1097* (2013.01); *H04L 67/1008* (2013.01)

(58) Field of Classification Search
CPC ..................... G06F 17/3071; G06F 17/30598
USPC .................................................. 707/737, 827
See application file for complete search history.

(56) References Cited

U.S. PATENT DOCUMENTS

| 6,023,706 | A  | * | 2/2000  | Schmuck et al. ..................... 1/1 |
|-----------|----|---|---------|------------------------------------------|
| 7,194,532 | B2 |   | 3/2007  | Sazawa et al.                            |
| 7,464,240 | B2 |   | 12/2008 | Caulkins et al.                          |
| 7,584,261 | B1 |   | 9/2009  | Teodosiu et al.                          |
| 7,617,322 | B2 |   | 11/2009 | Ahmed et al.                             |
| 7,831,977 | B2 |   | 11/2010 | Shultz et al.                            |
| 8,346,824 | B1 | * | 1/2013  | Lyle et al. ...................... 707/822 |
| 2002/0095400 | A1 | * | 7/2002 | Johnson et al. ................... 707/1 |

(Continued)

OTHER PUBLICATIONS

Gole et al., "Peer-To-Peer Based Caching for Network File System," U.S. Appl. No. 13/020,697, filed Feb. 3, 2011, 36 pages.

*Primary Examiner* — Noosha Arjomandi
(74) *Attorney, Agent, or Firm* — White & Case LLP

(57) ABSTRACT

Systems and techniques relating to network file systems for balancing caching load in peer-to-peer based network file systems are described. In one aspect, a method includes maintaining, by a cluster containing two or more computer systems, information about files cached at a network that includes three or more computer systems configured to cache data associated with a file server system. The method also includes receiving, from one of the computer systems of the network, a request to identify at least one computer system of the network that caches a specified file. Further, the method includes identifying, by the cluster in response to the received request, one or more computer systems of the network that cache the specified file based on the maintained information. Furthermore, the method includes providing, by the cluster to the requesting computer system, information referencing at least the identified one or more computer systems of the network.

16 Claims, 10 Drawing Sheets

(56) References Cited

U.S. PATENT DOCUMENTS

| | | |
|---|---|---|
| 2003/0069968 A1* | 4/2003 | O'Neil et al. ............... 709/225 |
| 2006/0230111 A1 | 10/2006 | Andersen et al. |
| 2009/0271779 A1 | 10/2009 | Clark |
| 2009/0313438 A1* | 12/2009 | Krishnaprasad et al. ..... 711/133 |
| 2010/0106895 A1 | 4/2010 | Condit et al. |
| 2010/0138542 A1 | 6/2010 | Davis et al. |
| 2010/0250742 A1 | 9/2010 | Leighton et al. |
| 2011/0145363 A1 | 6/2011 | Ananthanarayanan et al. |
| 2011/0173090 A1 | 7/2011 | Miller et al. |
| 2011/0225312 A1 | 9/2011 | Liu et al. |

* cited by examiner

BALANCING CACHING LOAD IN A PEER-TO-PEER BASED NETWORK FILE SYSTEM

CROSS REFERENCE TO RELATED APPLICATION

This disclosure claims the benefit of the priority of U.S. application Ser. No. 13/220,200, filed Aug. 29, 2011 (now U.S. Pat. No. 8,463,788), which claims the benefit of priority of U.S. Provisional Application Ser. No. 61/380,010, filed Sep. 3, 2010 and entitled "LOAD BALANCER," which are incorporated herein by reference in their entirety.

BACKGROUND

The present disclosure describes systems and techniques relating to balancing caching load in peer-to-peer based network file systems.

A server system can export one or more file systems over a network to client systems. The server system can include one or more data storage devices such as a hard disk drive (HDD) or a solid state drive (SSD). Various examples of a server system include a Network Attached Storage (NAS) device and a server configured to service a network file system (NFS). The server servicing the NFS can be referred to as a NFS server. NFS servers are frequently used in data centers for data access and sharing data among clients.

Multiple client systems can mount a NFS exported by a NFS server. A client system can run a NFS client to connect with one or more NFS servers to mount one or more NFSs. An operating system can provide access to local and network file systems to one or more applications such as a web server, e-mail server, database, or an operating system process. For example, an operating system can access one or more system files on a NFS. Typically, an application is agnostic regarding whether a file system is a network file system or a local file system.

SUMMARY

The present disclosure describes systems and techniques relating to caching load balancing in a network file system (NFS). For example, files associated with the NFS can be cached across peer-to-peer (P2P) clients of the NFS. A resource associated with the NFS represents a caching load balancer that can map the files cached across the P2P NFS clients to corresponding P2P NFS client addresses where the files are being cached. In case of a failure associated with a P2P NFS client, the caching load balancer can dynamically redistribute the files cached at the failed P2P NFS client to other P2P NFS clients, and can remap the redistributed files to their current P2P NFS client addresses. Such a caching load balancer can be implemented as a cluster of devices in communication with P2P clients of the NFS. Moreover, some or all of the devices of the cluster associated with the caching load balancer can be P2P NFS clients. As such, the cluster of devices associated with the caching load balancer can distribute caching load fairly among P2P NFS clients, rebalance caching load in case of failures of P2P clients associated with the NFS, and can adaptively distribute caching load across the P2P NFS clients. The latter can be implemented based on caching activity and load patterns at the P2P NFS clients.

According to an aspect of the present disclosure, a system includes a cluster including two or more computer systems. The cluster is communicatively coupled with a network that includes three or more computer systems configured to cache data associated with a file server system. Each of the two or more computer systems of the cluster is configured to maintain information about files cached at the three or more computer systems of the network, and to receive, from one of the three or more computer systems of the network, a request to identify at least one computer system of the network that caches a specified file. Further, each of the two or more computer systems of the cluster is configured to identify, in response to the received request, one or more computer systems of the network, other than the requesting computer system, that cache the specified file based on the maintained information. In addition, each of the two or more computer systems of the cluster is configured to provide, to the requesting computer system, information referencing at least the identified one or more computer systems of the network.

These and other implementations can include one or more of the following features. In some implementations, at least one computer system of the cluster can be part of the network that includes the three or more of the computer systems configured to cache the data associated with the file server system. In some instances, all computer systems of the cluster are part of the network that includes the three or more of the computer systems configured to cache the data associated with the file server system. In some instances, the requesting computer system is not included in the two or more computer systems of the cluster.

In some implementations, the provided information referencing at least the identified one or more computer systems of the network can include permission information associated with an instance of the specified file that is cached at the identified one or more computer systems of the network. Furthermore, each of the two or more computer systems of the cluster can be configured to monitor caching load of each of the three or more computer systems of the network, and in response to the provided information referencing multiple computer systems of the network that cache the specified file, prioritize the provided information based on respective caching loads of the multiple computer systems referenced by the provided information. In some implementations, the cluster has a single identifier to be used by the three or more computer systems of the network that are not part of the cluster, and each of the two or more computer systems of the cluster can be further configured to respond to the request based on recognition of the single identifier.

In some implementations, each of the two or more computer systems of the cluster can be configured to receive from the requesting computer system a notification that the specified file was retrieved from a first computer system referenced by the provided information, and to update the maintained information in accordance with the received notification. The update can relate to caching load at the requesting computer system, and to caching activity at the first computer system. In some implementations, each of the two or more computer systems of the cluster can be configured to receive from the requesting computer system a notification that the specified file was absent at a first computer system referenced by the provided information, and that the specified file was retrieved from a second computer system referenced by the provided information. Also, each of the two or more computer systems of the cluster can be configured to update the maintained information in accordance with the received notification. The update can relate to respective caching loads at the requesting computer system and at the first computer system, and to caching activity at the second computer system.

According to another aspect of the present disclosure, a device includes memory and circuit electronics. The device is configured to connect with a network that includes a caching load balancer and three or more devices, which include the device. The devices are configured to cache data associated with a file server system, such that the devices have respective connections with the file server system. The circuit electronics are configured to detect that a specified file is not cached on the memory of the device, and to request, from the caching load balancer in response to the detection, information that identifies at least one of the three or more devices of the network that cache the specified file. Further, the circuit electronics are configured to receive from the caching load balancer a response including information identifying one or more devices of the three or more devices of the network that cache the specified file, and to communicate with at least one device of the one or more devices referenced by the response received from the caching load balancer to retrieve the specified file. Furthermore, the circuit electronics is configured to retrieve and cache the specified file based on the communication with the at least one device referenced by the response received from the caching load balancer, and to provide the caching load balancer a notification including an identity of the at least one device referenced by the response received from the caching load balancer with which the device has communicated to retrieve the specified file, and a confirmation that the specified file is cached on the memory of the device.

These and other implementations can include one or more of the following features. In some implementations, the information included in the response received from the caching load balancer can include permission information associated with an instance of the specified file that is cached at the identified one or more devices of the network. In such implementations, the circuit electronics can be configured to request to access the specified file to perform a given action, prior to detecting that the specified file is not cached on the memory of the device. Additionally, the circuit electronics can be configured to select the at least one device for communication based on a permission associated with an instance of the specified file cached at the at least one device meeting a permission corresponding to the given action. In some instances, the information included in the response received from the caching load balancer can identify multiple devices. In such instances, the circuit electronics can be configured to carry out the communication with the at least one device of the identified multiple devices in an order based on criteria including a predefined quantity of network hops between the device and the identified multiple devices. Further in these instances, the information included in the response received from the caching load balancer includes respective caching loads of the identified multiple devices, and the criteria can further include a predefined caching load level of the identified multiple devices.

In some implementations, the communication with the at least one device referenced by the response received from the caching load balancer can include a request transmitted to a first device referenced by the response received from the caching load balancer to provide the specified file, and a response received from the first device including the specified file. Additionally, the notification to the caching load balancer can include the identity of the first device. Moreover, the communication with the at least one device referenced by the response received from the caching load balancer can include a request transmitted to a first device referenced by the response received from the caching load balancer to provide the specified file, a response received from first device to notify the device that the specified file is missing at the first device. Upon receipt of the response from the first device, this communication can include a request transmitted to a second device referenced by the response received from the caching load balancer to provide the specified file. Further, the notification to the caching load balancer can include the identities of the first and second devices and information that the specified file is missing at the first device.

In some cases, the communication with the at least one device referenced by the response received from the caching load balancer further includes a response received from the second device including the specified file. In some other cases, the information included in the response received from the caching load balancer can identify the first and second devices as being the only devices of the network that cache the specified file. In such cases, the communication with the at least one of the devices referenced by the response received from the caching load balancer can further include a response received from the second device to notify the device that the specified file is missing at the second device, and the notification to the caching load balancer further includes information that the specified file is missing at the second device. In such cases, the circuit electronics can be further configured to request the specified file from the file server system, in response to having determined that the specified file is missing at the devices referenced by the response received from the caching load balancer. Additionally, the circuit electronics can be configured to receive from the file server system a response including the specified file.

In some implementations, the circuit electronics can be configured to store the information included in the response received from the caching load balancer identifying the one or more devices of the three or more devices of the network that cache the specified file. Also, the circuit electronics can be configured to detect a cache miss upon an attempt to locally access the specified file, and to determine, responsive to having detected the cache miss, whether the stored information identifying the one or more devices of the three or more devices of the network that cache the specified file is fresh or stale, prior to using the stored information to retrieve the specified file. For example, the stored information identifying the one or more devices of the three or more devices of the network that cache the specified file can be considered fresh if the information was stored for a time interval shorter than a predefined duration, and can be considered stale if the information was stored for a time interval longer than or equal to the predefined duration.

In these implementations, responsive to a result of the determination being that the stored information is stale, the circuit electronics can be configured to discard the stored information, and to request, from the caching load balancer, information that identifies at least one of the three or more devices of the network that currently cache the specified file. Also in these implementations, responsive to a result of the determination being that the stored information is fresh, the circuit electronics can be configured to communicate with at least one device referenced by the stored information identifying the one or more devices of the three or more devices of the network that cache the specified file to retrieve the specified file. Additionally in these implementations, if the device communicates with only one device referenced by the stored information, then the circuit electronics can be configured to, responsive to the communication conveying that the specified file is missing at the one device, discard the stored information, and to request, from the caching load balancer, information that identifies at least one of the three or more devices of the network that currently cache the specified file.

According to another aspect of the present disclosure, a method includes maintaining, by a cluster including two or more computer systems, information about files cached at a network that includes three or more computer systems configured to cache data associated with a file server system. The method also includes receiving, by the cluster from one of the three or more computer systems of the network, a request to identify at least one computer system of the network that caches a specified file. Further, the method includes identifying, by the cluster in response to the received request, one or more computer systems of the network, other than the requesting computer system, that cache the specified file based on the maintained information. Furthermore, the method includes providing, by the cluster to the requesting computer system, information referencing at least the identified one or more computer systems of the network.

These and other implementations can include one or more of the following features. In some implementations, at least one computer system of the cluster can be part of the network that includes the three or more of the computer systems configured to cache the data associated with the file server system. For example, all computer systems of the cluster can be part of the network that includes the three or more of the computer systems configured to cache the data associated with the file server system. As another example, the requesting computer system is not included in the two or more computer systems of the cluster. In some implementations, the cluster can have a single identifier to be used by the three or more computer systems of the network that are not part of the cluster, and such, the method can include responding, by the cluster, to the request based on recognition of the single identifier.

In some implementations, the provided information referencing at least the identified one or more computer systems of the network can include permission information associated with an instance of the specified file that is cached at the identified one or more computer systems of the network. In some implementations, the method can include monitoring, by the cluster, caching load of each of the three or more computer systems of the network, and in response to the provided information referencing multiple computer systems of the network that cache the specified file, prioritizing, by the cluster, the provided information based on respective caching loads of the multiple computer systems referenced by the provided information.

In some implementations, the methods can include receiving, by the cluster from the requesting computer system, a notification that the specified file was retrieved from a first computer system referenced by the provided information, and updating, by the cluster, the maintained information in accordance with the received notification. The update can relate to caching load at the requesting computer system and to caching activity at the first computer system. In some implementations, the method can include receiving, by the cluster from the requesting computer system, a notification that the specified file was absent at a first computer system referenced by the provided information and that the specified file was retrieved from a second computer system referenced by the provided information, and updating, by the cluster, the maintained information in accordance with the received notification. The update can relate to respective caching loads at the requesting computer system and at the first computer system, and to caching activity at the second computer system.

According to another aspect of the present disclosure, a method includes detecting, by a device, that a specified file is not cached locally at the device. The device is configured to connect with a network that includes a caching load balancer and three or more devices, which include the device. The devices are configured to cache data associated with a file server system. The method also includes requesting, by the device from the caching load balancer in response to detecting, information that identifies at least one of the three or more devices of the network that cache the specified file, and receiving, by the device from the caching load balancer, a response including information identifying one or more devices of the three or more devices of the network that cache the specified file. Further, the method includes communicating by the device with at least one device of the one or more devices referenced by the response received from the caching load balancer to retrieve the specified file. Furthermore, the method includes retrieving, by the device, and caching, at the device, the specified file based on the communication with the at least one device referenced by the response received from the caching load balancer. In addition, the method includes providing, by the device to the caching load balancer, a notification including an identity of the at least one device referenced by the response received from the caching load balancer with which the device has communicated to retrieve the specified file, and a confirmation that the specified file is cached at the device.

These and other implementations can include one or more of the following features. In some implementations, the information included in the response received from the caching load balancer includes permission information associated with an instance of the specified file that is cached at the identified one or more devices of the network. In these instances, the method can further include, prior to detecting that the specified file is not cached at the device, requesting, by the device, to access the specified file to perform a given action. Additionally, the method can include selecting, by the device, the at least one of the devices for communication based on a permission associated with an instance of the specified file cached at the at least one device meeting a permission corresponding to the given action. Further in these instances, the information included in the response received from the caching load balancer can identify multiple devices, and the method can further include carrying out, by the device, the communication with the at least one device of the identified multiple devices in an order based on criteria including a predefined quantity of network hops between the device and the identified multiple devices. Furthermore, the information included in the response received from the caching load balancer can include respective caching loads of the identified multiple devices, and the criteria further can include a predefined caching load level of the identified multiple devices.

In some implementations, communicating with the at least one device referenced by the response received from the caching load balancer can include transmitting a request to a first device referenced by the response received from the caching load balancer to provide the specified file, and receiving a response from the first device including the specified file. Additionally, providing the notification to the caching load balancer can include sending the identity of the first device.

In some implementations, communicating with the at least one device referenced by the response received from the caching load balancer can include transmitting a request to a first device referenced by the response received from the caching load balancer to provide the specified file, and receiving a response from first device to notify the device that the specified file is missing at the first device. Further, communicating with the at least one device can include transmitting, upon receiving the response from the first device, a request to a second device referenced by the response received from the caching load balancer to provide the specified file. In addition, providing the notification to the caching load balancer can include sending the identities of the first and second devices and information that the specified file is missing at the first device. In some cases, communicating with the at least one device referenced by the response received from the caching load balancer can further include receiving a response from the second device including the specified file. In some other cases, when the information included in the response received from the caching load balancer identifies the first and second devices as being the only devices of the network that cache the specified file, communicating with the at least one of the devices referenced by the response received from the caching load balancer further can include receiving a response from the second device to notify the device that the specified file is missing at the second device. In the latter cases, providing the notification to the caching load balancer further includes sending information that the specified file is missing at the second device. Further in the latter cases, the method can include, in response to determining that the specified file is missing at the devices referenced by the response received from the caching load balancer, requesting, by the device, the specified file from the file server system. In addition, the method can include receiving, by the device from the file server system, a response including the specified file.

In some implementations, the method can include storing, at the device, the information included in the response received from the caching load balancer identifying the one or more devices of the three or more devices of the network that cache the specified file. The method can further include detecting, by the device, a cache miss upon an attempt to locally access the specified file. Additionally, the method can include, in response to detecting the cache miss, determining, by the device, whether the stored information identifying the one or more devices of the three or more devices of the network that cache the specified file is fresh or stale, prior to using the stored information to retrieve the specified file. For example, the stored information identifying the one or more devices of the three or more devices of the network that cache the specified file can be considered fresh if the information was stored for a time interval shorter than a predefined duration, and can be considered stale if the information was stored for a time interval longer than or equal to the predefined duration. In response to determining that the stored information is stale, the method can include discarding, by the device, the stored information, and requesting, by the device from the caching load balancer, information that identifies at least one of the three or more devices of the network that currently cache the specified file. In response to determining that the stored information is fresh, the method can include communicating, by the device, with at least one device referenced by the stored information identifying the one or more devices of the three or more devices of the network that cache the specified file to retrieve the specified file. In some instances, the device communicates with only one device referenced by the stored information. In these cases, the method can include, in response to communicating with the one device conveying that the specified file is missing at the one device, discarding, by the device, the stored information, and requesting, by the device from the caching load balancer, information that identifies at least one of the three or more devices of the network that currently cache the specified file.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described.

Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus and system implementations can be realized from a disclosed method, computer-readable medium, or apparatus.

Implementations of the subject matter described in this specification can be configured so as to realize one or more of the following potential advantages. P2P NFS clients can share and cache data to increase performance of the NFS exported by an NFS server. The P2P NFS clients can provide increased file system performance to applications running on the P2P NFS client hosts via caching of data on local solid state devices. Further, the P2P NFS clients can provide improved metadata performance to the applications via caching of metadata on the local solid state devices. Furthermore, these P2P NFS clients can provide transparent file system access to the applications without requiring application-level changes. Also, the P2P NFS clients can decrease NFS server workload without requiring the NFS server to be aware of the P2P layer. The P2P NFS clients also can coordinate with each other by implementing the peer-to-peer protocol to implement a coherent distributed cache for application data.

In addition, the P2P NFS clients can use a caching load balancer to optimize activity at, and space on local caches. The caching load balancer can be implemented as a cluster of devices as described in this specification and can be accessed by the P2P NFS clients through a single identifier associated with the cluster, e.g., a primary virtual address, that is provided through a discovery protocol. The caching load balancer represents a highly available resource, without a single point of failure, because if a node that hosts the cluster's virtual IP (Internet Protocol) address signs off or fails, the virtual IP address of the cluster associated with the caching load balancer is picked up and hosted by another node of the cluster. In addition, by having a single system image outside of the cluster of devices, the internal organization of the caching load balancer need not be known by the P2P NFS clients. This allows for devices of the cluster associated with the caching load balancer to go offline and come back online without a need for the P2P NFS clients to know or update the organization of the cluster associated with the caching load balancer. The P2P clients of the NFS simply know about the virtual IP address that is used to contact the caching load balancer.

The caching load balancer described in this specification can adaptively distribute the cached files across P2P clients of the NFS. An adaptive caching load/activity distribution can be implemented by the caching load balancer, e.g., by identifying P2P NFS clients that cache files for the first time. In this specification, references to caching load/activity represent caching load, caching activity or both. Further, the caching load balancer can monitor and record most frequently cached files and the P2P NFS clients where the most frequently cached files are cached. For example, the caching load balancer can monitor not only that a given file is cached at a P2P NFS client, but it also records how frequently that P2P NFS client caches the given file, which other P2P NFS clients most frequently cache the given file, or both. Furthermore, the caching load balancer keeps track of the P2P NFS clients that most actively cache files, and the files that are cached at these active P2P NFS clients. Further, the caching load balancer keeps track of P2P NFS clients that are frequent users of locally stored information (e.g., metadata in the form of cache group objects) provided to the P2P NFS clients by the caching load balancer. These and other records maintained by the caching load balancer can be used to adaptively coordinate by the caching load balancer caching of files associated with the NFS across the P2P NFS clients.

In addition, the information provided by the caching load balancer to the P2P NFS clients when the P2P NFS clients request to access specified files includes, in addition to the addresses of the P2P NFS clients that cache the specified files, a caching load/activity at these P2P NFS clients. In this fashion, the requesting P2P NFS clients can be configured to select the least loaded/busy P2P NFS clients from among the P2P NFS clients that cache the specified file, and as a result, the requesting P2P NFS clients can access/retrieve the specified files at/from the selected P2P NFS clients. This represents a mechanism through which the NFS can self-balance activity and caching load across the P2P NFS clients based on information of instant or historical caching load/activity provided by the caching load balancer.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1A:
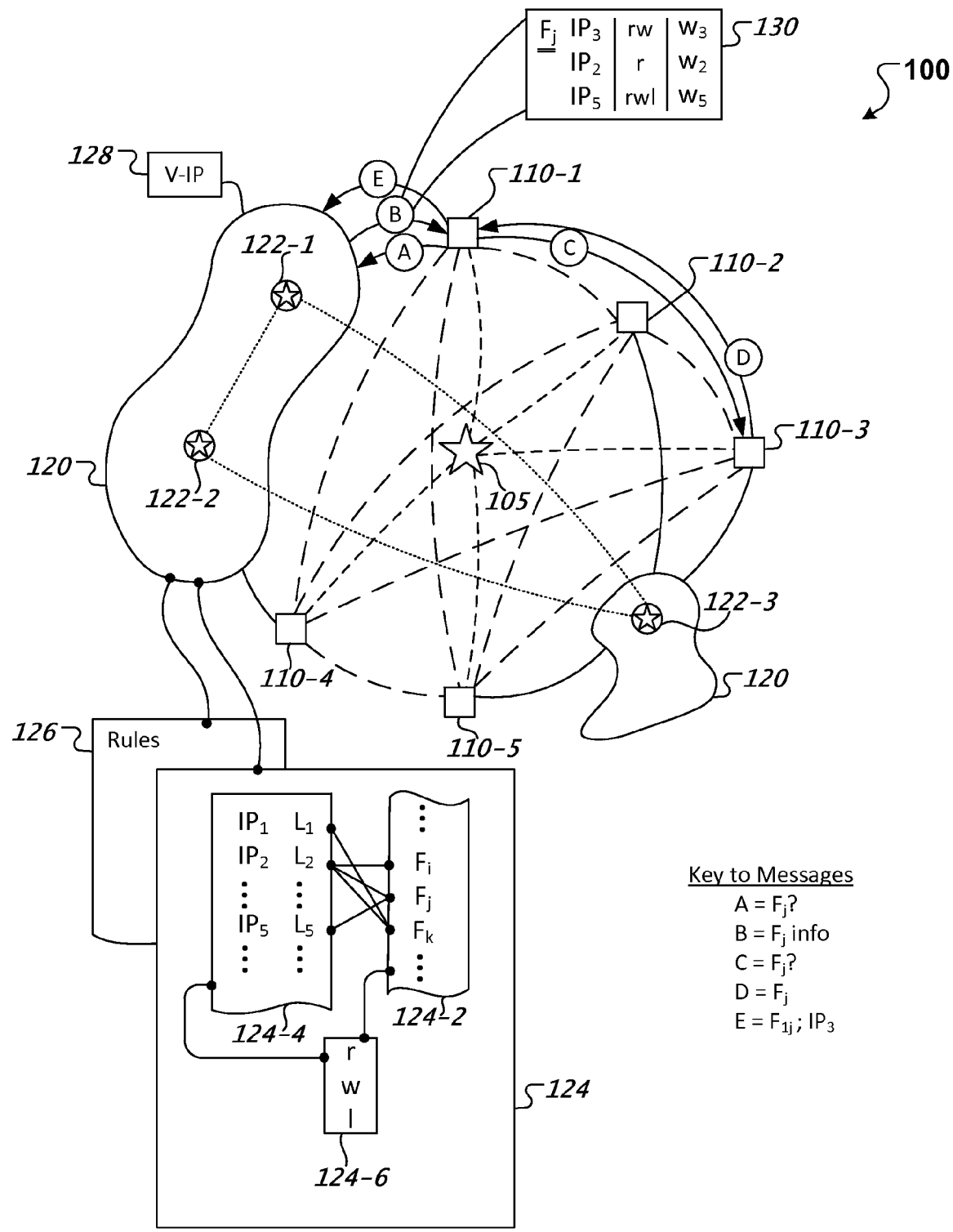
FIGS. 1A-1G show aspects of an example of a network file system (NFS) that includes peer-to-peer (P2P) clients and a caching load balancer.

FIG. 1A shows an example of a network file system 100 that includes a Network File System (NFS) server 105 that exchanges file data with three or more NFS clients, e.g., NFS clients 110-1, 110-2, 110-3, 110-4, 110-5. The NFS clients 110-1, 110-2, . . . can use locally cached file data to increase file system performance, e.g., reduce NFS server workload, decrease access time latency, or both. This disclosure describes systems and techniques to leverage local caches of NFS clients 110-1, 110-2, . . . to increase file system performance. As disclosed herein, the NFS clients 110-1, 110-2, . . . include a peer-to-peer (P2P) layer. As such, the NFS clients 110-1, 110-2, . . . can be referred to interchangeably as P2P-based NFS clients or peers. In this specification, P2P-based NFS clients 110-1, 110-2, . . . can communicate with each other to exchange file data, e.g., retrieve or distribute cached file data. In addition, the peers 110-$j$ ($j$ = 1, 2, . . . ) can select with which ones of the other peers 110-$k$ ($k \approx j$) to communicate based on information provided by a resource 120 configured to balance caching load across the P2P based clients 110 of the system 100.

Figure 1B:
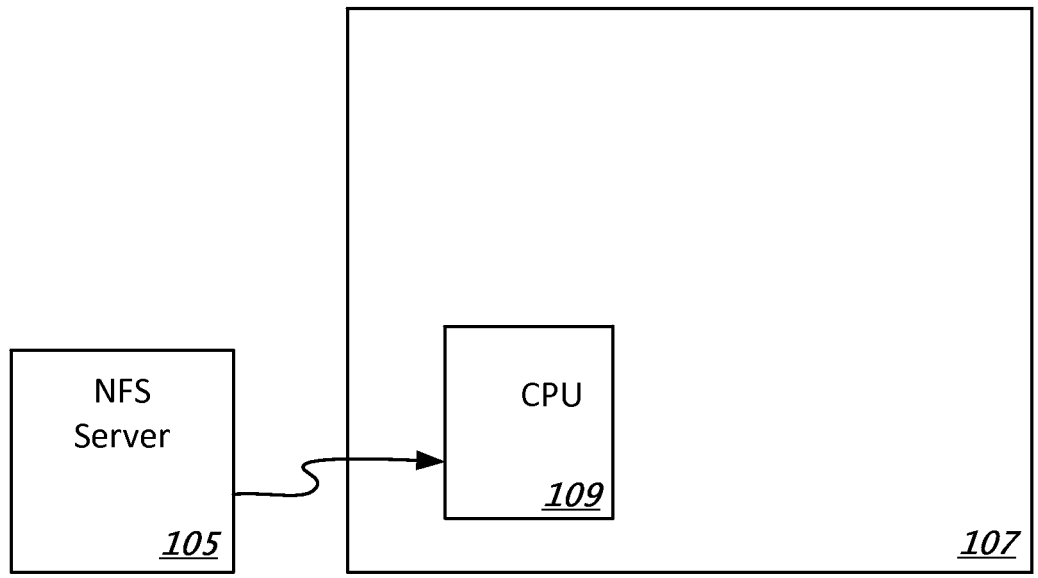

The NFS server 105 configured to provide file-based data storage services can be implemented on a NAS device, as shown in FIG. 1B. For example, the NAS device 107 can be a computer system that is connected to a network and includes processor electronics 109 (e.g., at least one central processing unit.) Moreover, the NAS device 107 can run the NFS server 105 that exports the network file system 100. The NFS server 105 can communicate with peer-to-peer (P2P) NFS clients 110-1, 110-2, . . . . In addition, the NFS server 105 can perform user authorization, authentication, and provide mechanisms for locking and cache coherency to the P2P NFS clients 110-1, 110-2, . . . .

Figure 1C:
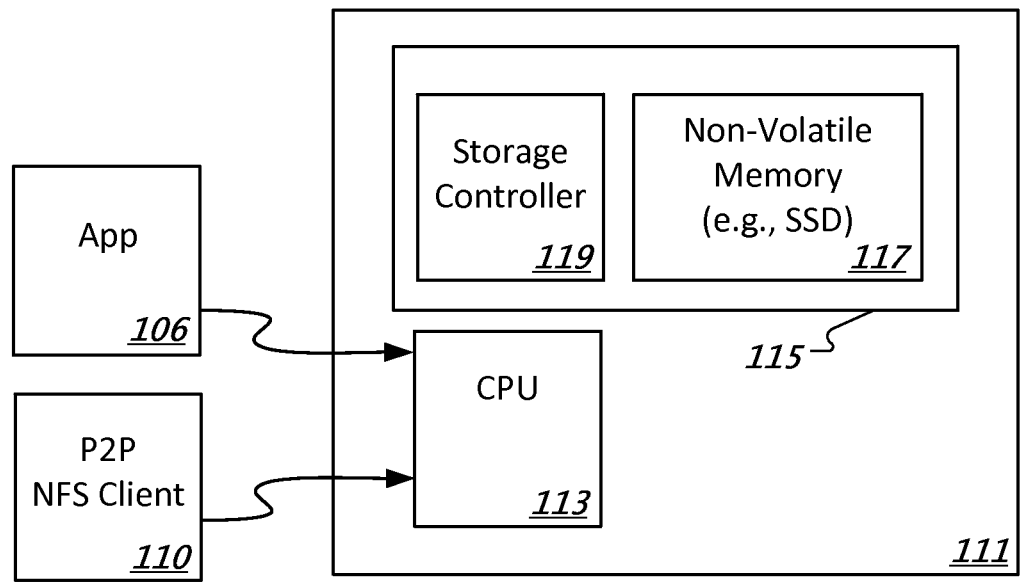

The NFS clients 110-1, 110-2, . . . can cache file data and metadata locally to accelerate local application performance. FIG. 1C shows an example of a device 111 operable to run a P2P NFS client 110. The device 111 can include processor electronics 113 (e.g., at least one central processing unit), a storage device 115 and a network interface. Processor electronics 113 can include one or more processors to run a P2P NFS client 110 as described herein. The storage device 115 can be implemented as a card including a storage controller 119 and non-volatile memory 117. The P2P NFS client 110 can communicate with network nodes such as the NFS server 105 or peers via the network interface. The P2P NFS client 110 can cache data in the non-volatile memory 117 by sending commands to the storage controller 119. In some implementations, the processor electronics 113 communicate with the storage controller 119 via an interface such as a Peripheral Component Interconnect (PCI), Serial Advanced Technology Attachment (SATA), Small Computer System Interface (SCSI), Serial Attached SCSI (SAS), Ethernet, or Universal Serial Bus (USB).

A P2P NFS client 110 can use a solid state device (SSD) to provide a persistent cache for file operations. For example, the non-volatile memory 117 can be implemented as a solid-state drive (SSD). In some implementations, the SSD can include flash memory. Flash memory is a type of computer memory that can be electronically erased and reprogrammed. NAND flash memory based SSDs can persistently store large amounts of data at costs lower than some other memory devices and with access speeds greater than that of magnetic disk devices. NAND flash memory based SSD can provide high speed random access at low costs. For example, a P2P NFS client 110 can use a NAND based SSD 117 to provide a flash based caching system to accelerate NFS accesses in the network file system 100.

A P2P NFS client 110 running in kernel space can mount the network file system 100 that is exported by the NFS server 105. An application 106 (e.g., database, email, and the like) running in user space can generate read and write requests for files. Such requests can be serviced by the P2P NFS client 110 if the requested files are associated with the network file system 100. A P2P NFS client 110-$j$ (where $j$=1,2, . . . ) can communicate with another of the P2P NFS clients 110-1, 110-2, . . . (via communication channels represented in FIG. 1A by long-dashed lines) to attempt to handle file system requests that cannot be serviced locally. If none of the other of the P2P NFS clients 110-1, 110-2, . . . is able to provide a cached version of a file for a read/write access, then the client 110-$j$ can communicate with the NFS server 105 (via a communication channel represented in FIG. 1A by short-dashed line) to retrieve the file. In this way, the P2P communication layer implemented by the P2P NFS clients 110-1, 110-2, . . . can reduce load on the NFS server 105.

In some implementations, the P2P NFS clients 110-1, 110-2, . . . can share the caching load by distributing the cached files based on one or more predefined rules that are known by all the P2P NFS clients 110-1, 110-2, . . . . For example, files having identifiers in a first range (e.g., file names starting with a letter from a-c) can be cached at a first P2P NFS client 110-1, files having identifiers in a second range (e.g., having file names starting with a letter from d-h) can be cached at a second P2P NFS client 110-2, and so on. As another example, files having been created within a first time interval (e.g., files created in 2011) can be cached at a first P2P NFS client 110-1, files having been created within a second time interval (e.g., files created in 2010) can be cached at a second P2P NFS client 110-2, and so on. In this manner, a P2P NFS client 110-j can request a specified file from a certain P2P NFS client known to cache the specified file in accordance with the predefined rule(s) used to share caching load among the P2P NFS clients 110-1, 110-2, . . . . However, such a P2P request would fail when the P2P NFS client 110-j attempts to communicate with the certain P2P NFS client, which is expected to cache the specified file, if the certain P2P NFS client is offline. Moreover, additional P2P NFS clients, which may have joined the NFS 100 since the load sharing rules were defined, would remain unused for caching, even though the additional P2P NFS clients can share the caching load with the P2P NFS clients that were part of the NFS 100 when the load sharing rules were defined.

FIG. 1A shows that a cluster of two or more network nodes 122-1, 122-2, . . . can be configured as a logical resource 120 associated with the NFS 100 to dynamically balance a caching load across the P2P NFS clients 110-1, 110-2, . . . . The resource 120 is referred to herein as a caching load balancer 120, or simply as a load balancer 120. The caching load balancer 120 is communicatively coupled with the P2P NFS clients 110-1, 110-2, . . . , such that any one of the P2P NFS clients 110-1, 110-2, . . . can communicate with the caching load balancer 120 using a single identifier associated with the cluster of the two or more network nodes 122-1, 122-2, . . . , e.g., a shared virtual IP address 128. In this manner, a P2P NFS client 110-j can notify the caching load balancer 120 when a file is cached at or evicted from the P2P NFS client 110-j. Based on this type of information received from each of the P2P NFS clients 110-1, 110-2, . . . , the caching load balancer 120 can maintain information about caching load/activity at the P2P NFS clients 110-1, 110-2, . . . . The maintained information can be stored by the caching load balancer 120 in a data structure 124, as described later in this specification.

The maintained information about caching load/activity at the P2P NFS clients 110-1, 110-2, . . . can be used by the caching load balancer 120 when a P2P NFS client 110-j inquires which of the P2P NFS clients 110-1, 110-2, . . . caches a specified file. In such case, the caching load balancer 120 can respond to the inquiry by providing the addresses of the P2P NFS clients that cache the specified file, and optionally, information related to caching load/activity levels at these P2P NFS clients. In this manner, the inquiring P2P NFS client 110-j can select to communicate with the least loaded/busy P2P NFS client that caches the specified file, thus implementing a self-balancing mechanism of caching load/activity across the P2P NFS clients 110-1, 110-2, . . . . In addition, the maintained information about caching load/activity at the P2P NFS clients 110-1, 110-2, . . . can be used by the caching load balancer 120 to adaptively distribute the caching load/activity across the P2P NFS clients 110-1, 110-2, . . . .

Figure 1D:
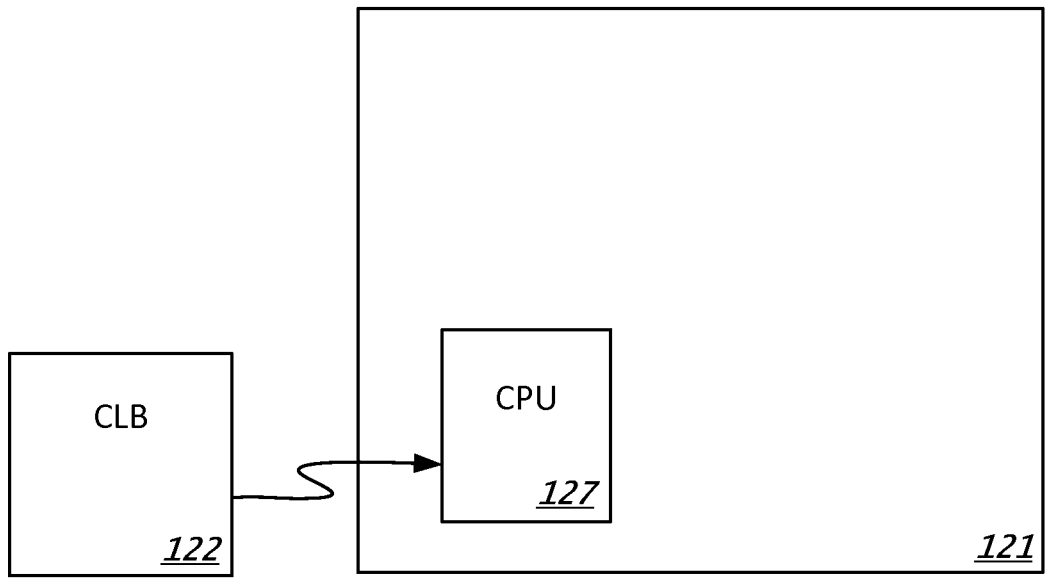

FIG. 1D shows an example of a device 121 used to implement a network node 122 of the cluster of network nodes 122-1, 122-2, . . . associated with the caching load balancer 120. The device 121 can be a computer system that includes processor electronics 127 (e.g., at least one central processing unit) and a network interface. Moreover, the device 121 can run the network node 122 that is part of the cluster of network nodes 122-1, 122-2, . . . associated with the caching load balancer 120. Other devices that can be used to run the network node 122 are described below in connection with FIGS. 1E-1G. The network nodes 122-1, 122-2, . . . can communicate with each other (via communication channels represented in FIG. 1A by dotted lines.) In some implementations, the network nodes 122-1, 122-2, . . . are configured to update respective local (to the network node) instances of the data structure 124, and then to synchronize these local instances into a single data structure 124, which stores the information maintained by the caching load balancer 120 about caching load/activity at the P2P NFS clients 110-1, 110-2, . . . . In other implementations, the network nodes 122-1, 122-2, . . . are configured to directly update the single data structure 124, which stores the information maintained by the caching load balancer 120. In both implementations, the single ("master") data structure 124 can be hosted on the same one of the cluster of network nodes 122-1, 122-2, . . . that hosts the virtual IP address 128, for instance.

Moreover, the virtual IP address 128 associated with the caching load balancer 120 can be hosted by a node 122-k (where k=1,2, . . . ) of the cluster of network nodes 122-1, 122-2, . . . . If the network node 122-k that hosts the caching load balancer 120's virtual IP address 128 signs off or fails, the virtual IP 128 address is picked up and hosted by another node 122-l (where l≠k) of the cluster of network nodes 122-1, 122-2, . . . . In this manner, the caching load balancer 120 represents a highly available resource, without a single point of failure. In addition, as the virtual IP address 128 represents the single image of the caching load balancer 120 outside of the cluster of network nodes 122-1, 122-2, . . . , it is unnecessary for the P2P NFS clients 110-1, 110-2, . . . to know the internal organization of the caching load balancer 120. This allows for devices of the cluster associated with the caching load balancer 120 to go offline and come back online without a need for the P2P NFS clients 110-1, 110-2, . . . to update the structure of the caching load balancer 120. The P2P NFS clients 110-1, 110-2, . . . need only know the virtual IP address 128 to contact the caching load balancer 120. This primary virtual address 128 can be acquired by the P2P NFS clients 110-1, 110-2, . . . through a discovery protocol (described below in this specification) used to discover the cluster of network nodes 122-1, 122-2, . . . associated with the caching load balancer 120.

As described in FIG. 1A, the caching load balancer 120 can store in the data structure 124 information collected as part of monitoring the caching activity at the P2P NFS clients 110-1, 110-2, . . . . In some implementations, the data structure 124 can include multiple tables. For example, the data structure 124 can be a relational database. A table 124-2 can store identifiers of a set of files { . . . , Fi, Fj, Fk, . . . } that are currently cached across the P2P NFS clients 110-1, 110-2, . . . . In the example of the network file system 100 illustrated in FIG. 1A, the file identifiers can be NFS file handles. Table 124-4 can store the addresses of the P2P clients 110-1, 110-2, . . . associated with the network file system 100, {IP1, IP2, . . . }. Each record in the table 124-4 can include a field related to a caching load/activity at the associated P2P NFS client. For instance, the P2P NFS client 110-1 has an address IP1 and a corresponding load/activity level L1, the P2P NFS client 110-2 has an address IP2 and a corresponding load/activity level L2, and so on.

For example, the load/activity level Lj can be a measure of the current quantity (or historical average) of files cached at the P2P NFS client 110-j. As another example, the load/activity level Lj can be a measure of the current (or historical average) caching activity at the P2P NFS client 110-j, where caching activity at a P2P NFS client can be defined as a rate of file additions, evictions or both at the P2P NFS client. As yet another example, the load/activity level Lj can be a combination of the above caching load/activity metrics. Moreover, the caching load balancer 120 can map each one of the file identifiers {. . . , Fi, Fj, Fk, . . . } to the corresponding P2P NFS clients where the one file is cached. In the example illustrated in FIG. 1A, the file Fi is cached at the P2P NFS client 110-2; the file Fj is cached at the P2P NFS clients 110-2 and 110-5; the file Fk is cached at the P2P NFS clients 110-1, 110-2 and 110-5, and so on.

Further, table 124-6 stores permission attributes corresponding to the files that are currently cached across the P2P NFS clients 110-1, 110-2, . . . , e.g., read, write and lock. The table 124-6 can be used by the caching load balancer 120 to map permissions associated with each one of the file identifiers {. . . , Fi, Fj, Fk, . . . } and the corresponding P2P NFS clients where the one file is cached. For instance, file Fj is currently cached at the P2P NFS client 110-2 where it can be accessed only for reading and at the P2P NFS client 110-5 where it can be accessed for reading, writing and locking.

Another relation maintained by the caching load balancer 120 as part of the data structure 124 can be the mapping of currently cached files at each one of the P2P NFS clients 110-1, 110-2, . . . . In the example illustrated in FIG. 1A, the P2P NFS client 110-1 caches the file Fk; the P2P NFS client 110-2 caches the files Fi, Fj and Fk; the P2P NFS client 110-5 caches the files Fj and Fk. Additional tables and mappings can be included in the data structure 124.

As described above, a P2P NFS client 110-*j* can communicate with other P2P NFS clients 110-1, 110-2, . . . to access/retrieve a specific file that is not cached locally at the P2P NFS client 110-*j*. The P2P NFS client 110-*j* can randomly select another P2P NFS client 110-*k* (with k≈j) without knowing whether the randomly selected P2P NFS client 110-*k* currently caches the specified file. If the latter does not cache the specified file, the P2P NFS client 110-*j* can sequentially request the specified file from other randomly selected P2P NFS peers, until it locates the specified file at one of the randomly selected peers. The P2P NFS client 110-*j* also can select the other P2P NFS client 110-*k* (with k≈j) from which to request the specific file based on knowledge of a predefined rule that the specified file should be cached at the selected P2P NFS client 110-*k* in accordance with some static caching distribution.

Alternatively, the P2P NFS client 110-*j* can take advantage of the information about caching load/activity at the P2P NFS clients 110-1, 110-2, . . . that is maintained by the caching load balancer 120 by requesting from the latter to identify the ones from among the P2P NFS clients 110-1, 110-2, . . . that currently cache the specified file. In the example illustrated in FIG. 1A, the specified file is Fj, and a request from the P2P NFS client 110-1 that the caching load balancer 120 identifies the ones from among the P2P NFS clients 110-2, 110-3, . . . that currently cache the specified file Fj is represented by a solid arrow labeled "A".

In response to the foregoing request from the P2P NFS client 110-1, the caching load balancer 120 can provide the requested information in the form of a data structure 130 called a cache group object (CGO) associated with the file Fj specified by the requesting P2P NFS client 110-1. The CGO 130 associated with the specified file Fj can be in the form of a list or a look-up table, for instance. The caching load balancer 120 generates the CGO 130 associated with the specified file Fj by retrieving from the stored data structure 124 at least identifiers of the ones from among the P2P NFS clients 110-2, 110-3, . . . that currently cache the specified file Fj, and permission attributes corresponding to instances of the specified file Fj as cached at the identified ones from among the P2P NFS clients 110-2, 110-3, . . . . In some implementations, the P2P NFS client identifiers can be their respective IP addresses. In the example illustrated in FIG. 1A, the CGO 130 identifies the P2P NFS client 110-2 as caching an instance of the specified file Fj that can be accessed only for reading, the P2P NFS client 110-3 as caching another instance of the specified file Fj that can be accessed for read or write operations, and the P2P NFS client 110-5 as caching another instance of the specified file Fj that can be accessed for read or write operations and that can be locked. Further in the example illustrated in FIG. 1A, the response from the caching load balancer 120 to the P2P NFS client 110-1 is represented by a solid arrow labeled "B" and includes the CGO 130 associated with the specified file Fj.

Optionally, the CGO 130 can include representations of caching load/activity at the ones from among the P2P NFS clients 110-2, 110-3, . . . that currently cache the specified file Fj. For example, the caching load/activity at a given P2P NFS client can be represented by a weight that takes into account a quantity of files cached at the given P2P NFS client, a rate of accessing the files cached at the given P2P NFS client, a measure of how fresh or stale or both the cached instance of the specified file Fj is, and other heuristics. These and other criteria for generating the weights representing the caching load/activity at the ones from among the P2P NFS clients 110-2, 110-3, . . . that currently cache the specified file Fj can be maintained by the caching load balancer 120 as part of rules 126. Further, the caching load balancer 120 can order the information included in the CGO 130 by the load/activity-related weight associated with each of the P2P NFS clients 110-2, 110-3, . . . that currently cache the specified file Fj. In the example illustrated in FIG. 1A, the least loaded/active P2P NFS client that currently caches the specified file Fj is the P2P NFS client 110-3, and hence, it is listed first in the CGO 130. The P2P NFS clients 110-2 and 110-5 also currently cache the specified file Fj and are listed second and third because they are, respectively, more loaded/active than the P2P NFS client 110-3.

Upon receipt of the CGO 130, the P2P NFS client 110-1 can select one of the P2P NFS clients 110-2, 110-3, 110-5 identified to currently cache the specified file Fj. The selection can be performed by the P2P NFS client 110-1 based on the type of operation to be performed on the specified file Fj. For example, if an application running on the P2P NFS client 110-1 has to read from the specified file Fj, then any of the three P2P NFS clients identified in the CGO 130 can be selected. As another example, if the application running on the P2P NFS client 110-1 has to write to the specified file Fj, then one of P2P NFS client 110-3 and P2P NFS client 110-5 can be selected. As yet another example, if the application running on the P2P NFS client 110-1 needs to lock the specified file Fj, then the P2P NFS client 110-1 should access the specified file Fj at the P2P NFS client 110-5.

The foregoing selection also can be based on quantities of network hops from the P2P NFS client 110-1 to the P2P NFS clients 110-2, 110-3, 110-5 identified to currently cache the specified file Fj. In the example illustrated in FIG. 1A, the P2P NFS client 110-1 may select to access the specified file Fj at the P2P NFS client 110-2, because the path from the P2P NFS client 110-1 to the P2P NFS client 110-2 is shorter (in terms of a quantity of network hops) than the paths to the other two P2P NFS clients identified to currently cache the specified file Fj.

Additionally, the selection by the P2P NFS client 110-1 of one of the P2P NFS clients 110-2, 110-3, 110-5 at which to access the specified file Fj can be based on their respective levels of caching load/activity as documented in the received CGO 130. In the example illustrated in FIG. 1A, the P2P NFS client 110-1 chooses to request the specified file from the P2P NFS client 110-3 because the latter is less loaded/busy than the P2P NFS clients 110-2 and 110-5. Alternatively, a P2P NFS client 110-1 can choose to request the specified file from any one of the P2P NFS clients 110-2, 110-3, 110-5 that has a load/activity level below a predefined level. Further, the request from the P2P NFS client 110-1 to the P2P NFS client 110-3 to retrieve the specified file Fj is represented by a solid arrow labeled "C".

In response to the request to retrieve the specified file Fj, the P2P NFS client 110-1 can receive from the P2P NFS client 110-3 a response including the specified file Fj, when the P2P NFS client 110-3 currently caches the specified file Fj. In the example illustrated in FIG. 1A, the response received by the P2P NFS client 110-1 from the P2P NFS client 110-3 is represented by a solid arrow labeled "D". Upon successfully retrieving the specified file Fj from the P2P NFS client 110-3, the P2P NFS client 110-1 can notify the caching load balancer 120 that the specified file Fj was retrieved from the P2P NFS client 110-3 and is now cached at the P2P NFS client 110-1. In the example illustrated in FIG. 1A, the notification transmitted by the P2P NFS client 110-1 to the caching load balancer 120 is represented by a solid arrow labeled "E". The caching load balancer 120 can use the information included in the notification received from the P2P NFS client 110-1 to update appropriate records in the data structure 124. In this case, the caching load balancer 120 can update at least records relating to caching activity and caching load (inventory) at the P2P NFS client 110-1, where the specified file Fj has now been added, and relating to caching activity at the P2P NFS client 110-3 that provided the specified file Fj to the P2P NFS client 110-1.

However, the P2P NFS client 110-1 can receive from the P2P NFS client 110-3 a notification that the specified file Fj is no longer cached there. Upon failing to retrieve the specified file Fj from the P2P NFS client 110-3, the P2P NFS client 110-1 can request to retrieve the specified file Fj from one of the other P2P NFS clients 110-2 and 110-5 identified in the CGO 130. In addition, the P2P NFS client 110-1 can provide the caching load balancer 120 information that, contrary to the information included in the provided CGO 130 associated with the specified file Fj, the latter was not cached at the P2P NFS client 110-3. In case the specified file can be retrieved from one of the other P2P NFS clients 110-2 and 110-5, the P2P NFS client 110-1 can provide the caching load balancer 120 an identifier of the P2P NFS client from which the specified file Fj was retrieved and that the latter is now cached at the P2P NFS client 110-1. In this case, the caching load balancer 120 can update at least information relating to caching activity and caching inventory at the P2P NFS client 110-1 where the specified file Fj has now been added, and at the P2P NFS client 110-3, where the specified file Fj is no longer cached.

Moreover, in case the specified file cannot be retrieved from the P2P NFS client 110-2 or from the P2P NFS client 110-5, the P2P NFS client 110-1 can retrieve the specified file from the NFS server 105. Further, the P2P NFS client 110-1 can provide the caching load balancer 120 information that the specified file Fj was retrieved from the NFS server 105 and is now cached at the P2P NFS client 110-1, and that the specified file Fj was not cached at any of the the P2P NFS clients 110-2, 110-3 and 110-5. In this case, the caching load balancer 120 can update at least information relating to caching activity and caching inventory at the P2P NFS client 110-1 where the specified file Fj has now been added, and at the P2P NFS clients 110-2, 110-3 and 110-5, where the specified file Fj is no longer cached.

Updates of the information stored in the data structure 124 performed by the caching load balancer 120 in the manner described above, enable the caching load balancer 120 to know a current distribution of the caching load/activity across the P2P NFS clients 110-1, 110-2, . . . . In this manner, the caching load balancer 120 can maintain as part of the data structure 124, or in additional data structures, records about temporal and spatial patterns for caching of a given file and caching activity at a certain P2P NFS client. Such information, whether current or historical, can be used by the caching load balancer 120 to adaptively coordinate caching of files across the P2P clients 110-1, 110-2, . . . of the NFS 100.

For example, the caching load balancer 120 can distribute the cached files across the P2P NFS clients 110-1, 110-2, . . . by identifying P2P NFS clients that joined the NFS 100 recently and are attempting to cache files for the first time. In this case, if a P2P NFS client 110-$j$ requests to access a specified file for the first time, the caching load balancer 120 can provide the P2P NFS client 110-$j$ information about other of the P2P NFS clients 110-1, 110-2, . . . that cache the specified file, and can instruct the P2P NFS client 110-$j$ to cache the file retrieved from one of the other P2P NFS clients 110-1, 110-2, . . . that cache the specified file. As another example, the caching load balancer 120 can distribute the cached files across the P2P NFS clients 110-1, 110-2, . . . by monitoring and recording most frequently cached files and ones of the P2P NFS clients 110-1, 110-2, . . . where the most frequently cached files are cached. In some implementations, the caching load balancer 120 can record that a given file is currently cached at a P2P NFS client 110-$j$, and also can have records of how frequently the P2P NFS client 110-$j$ has cached the given file in the past, and which other of the P2P NFS clients 110-1, 110-2, . . . most frequently cached the given file. In some implementations, the caching load balancer 120 can keep track of ones of the P2P NFS clients 110-1, 110-2, . . . that most actively cache or have cached files, and the files that are cached at these active P2P NFS clients. For instance, if information stored in the data structure 124 indicates that a P2P NFS client 110-$j$ used to be a frequent user of a given file before signing off from the NFS 100, then the caching load balancer 120 can instruct the P2P NFS client 110-$j$ to cache the given file upon rejoining the NFS 100. As yet another example, if a P2P NFS client 110-$j$ reads, writes and locks a given file, then the caching load balancer 120 can instruct the P2P NFS client 110-$j$ to also cache the given file.

An application program interface (API) can be used for communication between the caching load balancer 120 and the P2P clients 110-1, 110-2, . . . of the NFS 100. The API can include definitions for messages relating to node registration, unique-handle-to-location mapping, and notifications.

For example, a discovery protocol can be implemented via a routing locate_mlb( ). A P2P NFS client 110-$j$ can connect to the caching load balancer 120 by using this discovery protocol. In some implementations, a P2P NFS client 110-$j$ can begin a registration process to the NFS 100 by informing the caching load balancer 120 that the P2P NFS client 110-$j$ can be used for caching files. In return, the caching load balancer 120 can respond to the P2P NFS client 110-$j$ by at least providing the virtual IP address 128 associated with the caching load balancer 120.

As another example, the routine register_tnode(input node_id), which can return a handle into a variable rhandle, and the complementary routine unregister_tnode(rhandle) can be used by the caching load balancer 120 to register and unregister, respectively, a P2P NFS client 110-$j$ that requested to sign on to and to sign off from the NFS 100, respectively.

As another example, a routine objid_to_cgo(input uuid_file, output*cgo) can be used by the caching load balancer 120 to generate the CGO data structure 130 associated with a file specified by a unique file handle uuid_file. As describe above, the CGO 130 includes at least a unique-handle-to-location mapping between the specified file and the ones of the P2P clients 110-1, 110-2, . . . of the NFS 100 that currently cache the specified file.

As another example, the routine notify tnode(rhandle) can be used by the caching load balancer 120 to transmit notifications to a P2P NFS client 110-j. In the example illustrated in FIG. 1A, the notification labeled B is used by the caching load balancer 120 to provide the CGO 130 to the P2P NFS client 110-1.

As another example, the routine inform_cgo_add( ) can be used by a P2P NFS client 110-j to notify the caching load balancer 120 when the P2P NFS client 110-j proactively updates/adds a cache object to the CGO 130. In the example illustrated in FIG. 1A, the P2P NFS client 110-1 can inform the caching load balancer 120 through the notification labeled E that an instance of the specified file Fj is now cached at the P2P NFS client 110-1 and what type of permissions can be granted by the P2P NFS client 110-1 to other P2P NFS clients that would access the newly cached instance of the specified file Fj.

As another example, the routine inform_cgo_delete( ) can be used by a P2P NFS client 110-j to notify the caching load balancer 120 when the P2P NFS client 110-j fails to find a specified file at another P2P NFS client 110-k (where k≈j), even though the latter was identified in the CGO 130 as caching the specified file. In the example illustrated in FIG. 1A, the P2P NFS client 110-1 can inform the caching load balancer 120 through the notification labeled E that an instance of the specified file Fj was not found at the P2P NFS client 110-3, even though the CGO 130 identifies the P2P NFS client 110-3 as caching the specified file Fj.

As described above in connection with FIGS. 1A and 1D, the network nodes 122-1, 122-2, . . . of the cluster used to implement the caching load balancer 120 can be devices 121 that are dedicated to the caching load balancer 120. FIG. 1E shows an example of a NFS 100' that includes three or more P2P NFS clients, e.g., P2P NFS clients 110-1, 110-2, 110-3, 110-4, 110-5, and a caching load balancer 120'. A cluster of two or more network nodes 122-1/110-a, 122-2, . . . can be configured to provide the caching load balancer 120' associated with the NFS 100'. Some of the network nodes of the cluster, e.g., 122-2, 122-3, . . . , can be dedicated to the caching load balancer 120' and can be run by devices similar to the device 121 shown in FIG. 1D. Some other network nodes of the cluster associated with the caching load balancer 120', e.g., 122-1/110-a, . . . , can also be P2P clients of the NFS 100'. A single image of the caching load balancer 120' outside of the cluster of network nodes 122-1/110-a, 122-2, . . . is a virtual IP address 128'.

Although the network file systems 100 and 100' run the same total quantity of nodes, the NFS 100' runs more P2P NFS clients than the NFS 100. Hence, NFS 100' has more caching capacity than NFS 100 for the same total cost. In addition, the NFS 100' runs a caching load balancer 120' that uses the same total quantity of network nodes as the caching load balancer 120 of the NFS 100, although the caching load balancer 120' has fewer dedicated network nodes than the caching load balancer 120. Hence, the caching load balancer 120' associated with the NFS 100' can potentially have equal computational effectiveness as the caching load balancer 120 associated with the NFS 100. In this fashion, the NFS 100' is potentially more cost effective than the NFS 100.

Figure 1F:
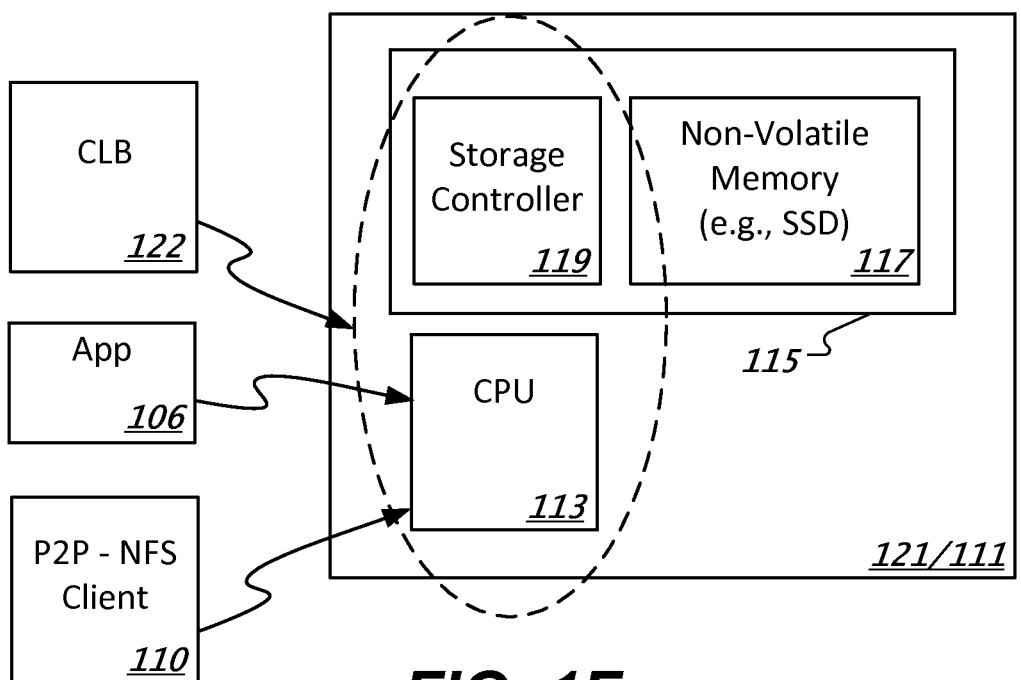
Figure 1E:
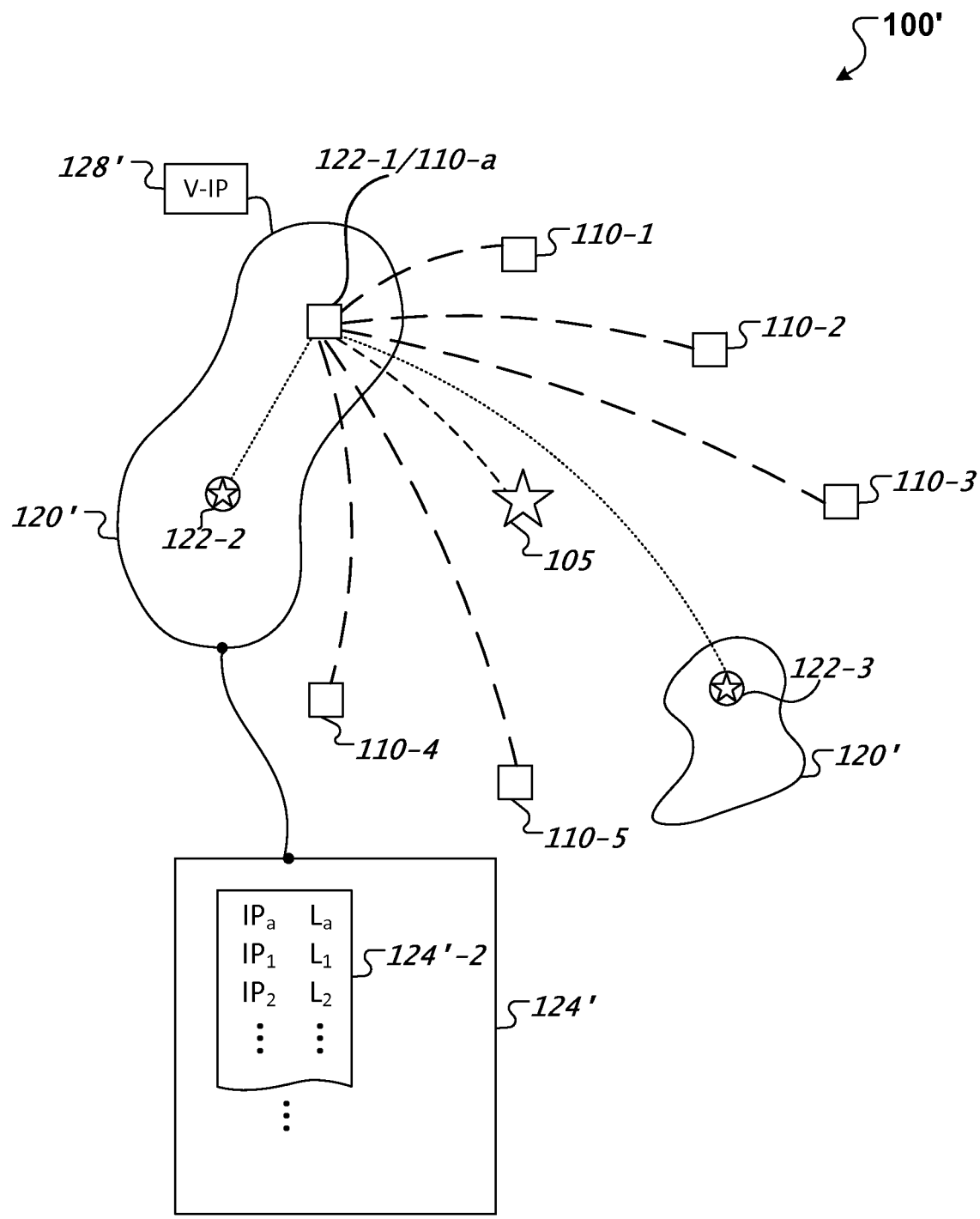

FIG. 1F shows an example of a device 121/111 that can run both a P2P NFS client 110 associated with the NFS 100' and a network node 122 associated with the caching load balancer 120'. The device 121/111 can be structurally and functionally similar to the device 111 shown in FIG. 1C, and can be configured to run the P2P NFS client 110 and an application 106 in processor electronics 113 (e.g., at least one central processing unit.) The application 106 can generate read and write requests for files. The P2P NFS client 110 can communicate with any other P2P clients of the NFS 100' to attempt to handle file system requests that cannot be serviced locally. In some implementations, the network node 122 associated with the caching load balancer 120' can be run by the processor electronics 113 of the device 121/111. In other implementations, the network node 122 associated with the caching load balancer 120' can be run by the storage controller 119 of the storage device 115. In some other implementations, the network node 122 associated with the caching load balancer 120' can be run collectively by the processor electronics 113 of the device 121/111 and by the storage controller 119 of the storage device 115.

Returning to FIG. 1E, node 122-1/110-a, as a P2P NFS client, can exchange files with any of the other P2P NFS clients 110-1, 110-2, . . . (via communication channels represented in FIG. 1E by long-dashed lines.) In addition, the node 122-1/110-a, as a network node of the cluster associated with the caching load balancer 120', can communicate with any of the other network nodes 122-1, 122-2, . . . associated with the caching load balancer 120' (via communication channels represented in FIG. 1E by dotted lines) to update a data structure 124' which stores information maintained by the caching load balancer 120' about caching load/activity at the P2P NFS clients 122-1/110-a, 110-1, 110-2, . . . Information relating to caching load/activity at the P2P NFS client 122-1/110-a is stored in a table 124'-2 of the data structure 124' in the form of a record including the IP address IPa of the P2P NFS client 122-1/110-a and its associated caching load/activity metric La.

Figure 1G:
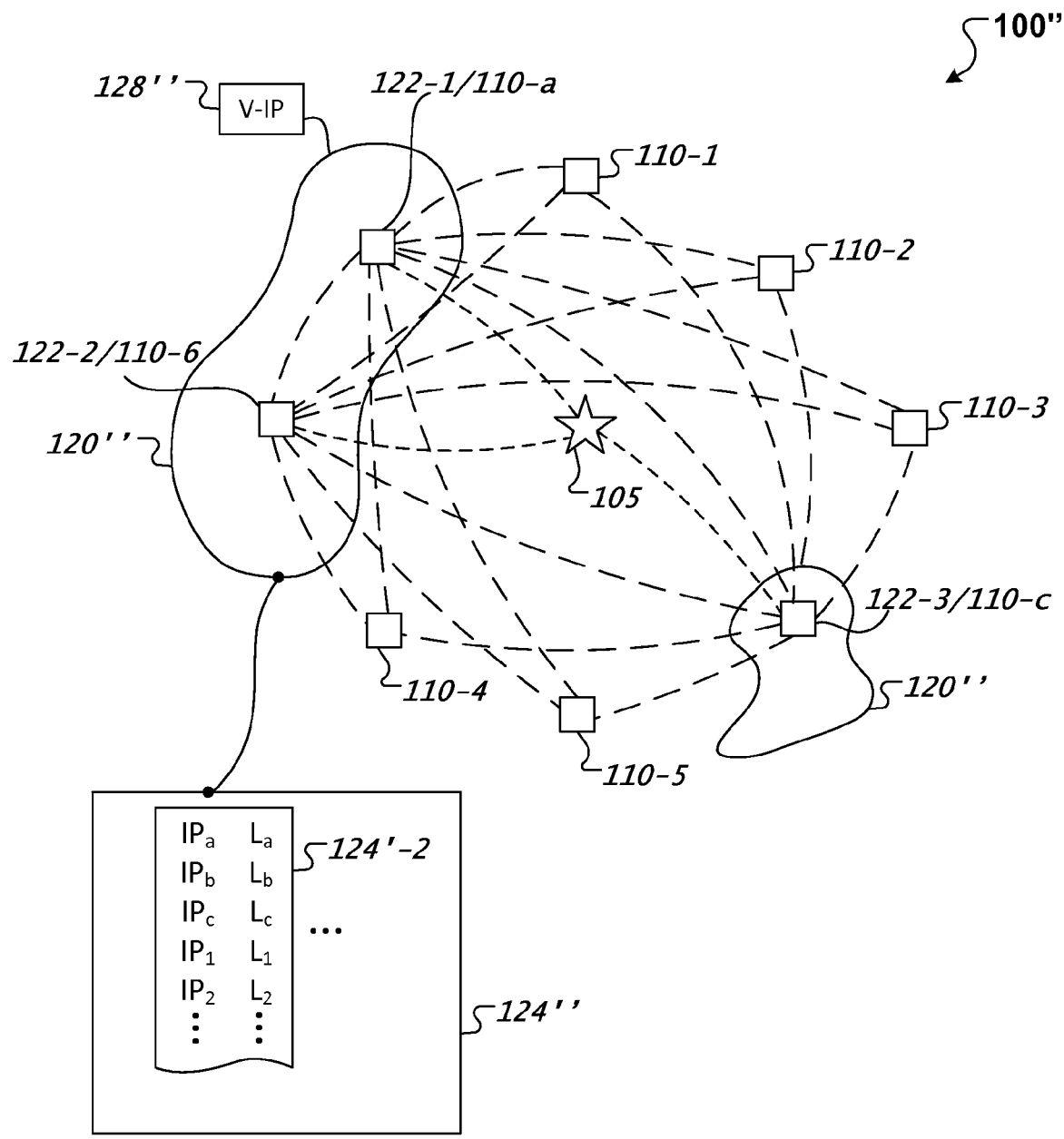

To further increase the cost effectiveness of a P2P-based network file system that includes a caching load balancer, the quantity of dedicated network nodes associated with the caching load balancer can be further decreased. A given NFS that has high cost effectiveness is shown in FIG. 1G. The NFS 100" includes three or more P2P NFS clients, for example P2P NFS clients 110-1, 110-2, 110-3, 110-4, 110-5, and a caching load balancer 120". A cluster of two or more network nodes 122-1/110-a, 122-2/110-b, 122-3/110c, . . . can be configured to provide the caching load balancer 120" associated with the NFS 100". In the example illustrated in FIG. 1G, all the network nodes of the cluster associated with the caching load balancer 120", e.g., 122-1/110-a, 122-2/110-b, 122-3/110c, . . . , also are P2P clients of the NFS 100". A single image of the caching load balancer 120" outside of the cluster of network nodes 122-1/110-a, 122-2/110-b, 122-3/110c, . . . is a virtual IP address 128".

The network nodes 122-1/110-a, 122-2/110-b, 122-3/110c, . . . associated with the caching load balancer 120" can be run by devices described above in connection with FIG. 1F. Nodes 122-1/110-a, 122-2/110-b, 122-3/110c, . . . , as P2P NFS clients, can exchange files with each other and with any of the other P2P NFS clients 110-1, 110-2, . . . (via communication channels represented in FIG. 1F by long-dashed lines.) In addition, the nodes 122-1/110-a, 122-2/110-b, 122-3/110c, . . . , as network nodes of the cluster associated with the caching load balancer 120", can communicate with each other (via the same communication channels used for P2P communications and represented in FIG. 1E by long-dashed lines) to update a data structure 124" which stores information maintained by the caching load balancer 120" about caching load/activity at the P2P NFS clients 122-1/110-a, 122-2/110-b, 122-3/110c, 110-1, 110-2, . . . . Information relating to caching load/activity at the P2P NFS clients 122-1/110-a, 122-2/110-b, 122-3/110c, . . . is stored in a table 124"-2 of the data structure 124" in the form of a records including the IP address IPa of the P2P NFS client 122-1/110-a and its associated caching load/activity metric La; the IP address IPb of the P2P NFS client 122-2/110-b and its associated caching load/activity metric Lb; and the IP address IPc of the P2P NFS client 122-3/110-c and its associated caching load/activity metric Lc.

Figure 2:
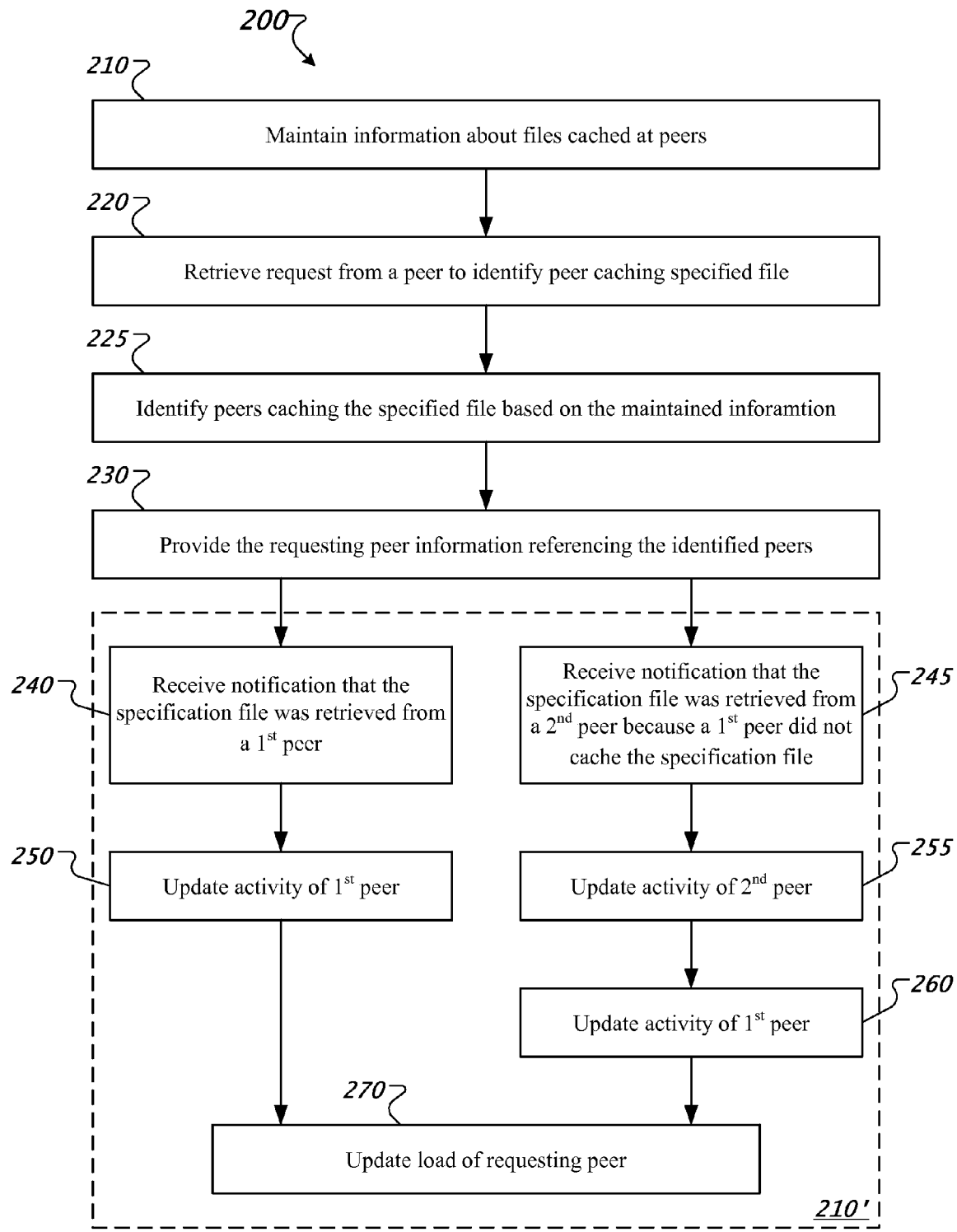
FIG. 2 shows an example of a process performed by a caching load balancer associated with a P2P-based NFS.

FIG. 2 shows an example of a process 200 performed by a caching load balancer associated with a P2P-based NFS. The P2P-based NFS can include three or more computer systems configured to cache data associated with the P2P-based NFS. At least some of the three or more computer systems included in the P2P-based NFS can communicate as peers as described above in connection with FIGS. 1A, 1E and 1G. For example, the peers included in the P2P-based NFS can correspond to the devices described above in connection with FIGS. 1B, 1C and 1F. The caching load balancer can be implemented as a cluster that includes two or more computer systems. For example, the computer systems included in the cluster associated with the caching load balancer can correspond to the devices described above in connection with FIGS. 1D and 1F. The cluster is communicatively coupled with the peers of the P2P-based NFS.

In some implementations, at least one computer system of the cluster also is a P2P client of the P2P-based NFS. In the example illustrated in FIG. 1E, one or more of the network nodes of the cluster associated with the caching load balancer 120' also are P2P NFS clients. In some implementations, all computer systems of the cluster also are P2P clients of the P2P-based NFS. In the example illustrated in FIG. 1G, all network nodes of the cluster associated with the caching load balancer 120" also are P2P NFS clients.

At 210, information about files cached at peers of the P2P-based NFS is maintained by the cluster associated with the caching load balancer. The information maintained by the cluster includes identifiers of the files cached at the peers of the P2P-based NFS, e.g., NFS file handles. The maintained information further can include, for each of the cached files, permission attributes associated with the one of the cached files corresponding to the peers at which the one file is cached. In some implementations, the cluster associated with the caching load balancer can monitor caching load/activity of each of the peers of the P2P-based NFS. In such implementations, the maintained information can include a measure of the monitored caching load/activity at each of the peers of the P2P-based NFS. In the examples illustrated in FIGS. 1A, 1E and 1G, the information maintained by the caching load balancer is stored in data structures 124, 124' and 124", respectively.

At 220, a request is received, by the cluster associated with the caching load balancer from a peer of the P2P-based NFS, to identify one or more other peers of the P2P-based NFS that cache a specified file. The requesting peer is not part of the cluster. The request can be received by the cluster via an application program interface (API). In addition, the requesting peer can communicate with the cluster, to submit the foregoing request or any other notification(s), by using a single virtual IP address associated with the cluster. In the examples illustrated in FIGS. 1A, 1E and 1G, the caching load balancers have corresponding virtual IP addresses 128, 128' and 128", respectively.

At 225, in response to the received request, one or more other peers of the P2P-based NFS that cache the specified file are identified by the cluster associated with the caching load balancer based on the maintained information. In some implementations, the caching load balancer can analyze the maintained information to determine those peers of the P2P-based NFS that are known to currently cache the specified file. The information analyzed in this manner can be aggregated in a data structure that can be transmitted to the requesting peer. In the example illustrated in FIG. 1A, the caching load balancer generates a cache group object (CGO), which can be a list or a lookup table, including a mapping of the specified file to identifiers of the peers that cache specified file.

At 230, information referencing at least the identified one or more other peers of the P2P-based NFS is provided by the cluster associated with the caching load balancer to the requesting peer. The provided information can further reference permission information associated with instances of the specified file that are cached at the identified one or more other peers of the P2P-based NFS. In some implementations, in response to the provided information referencing two or more other peers that cache the specified file, the cluster can prioritize the provided information based on respective caching loads/activities of the two or more other peers referenced by the provided information. In the example illustrated in FIG. 1A, the caching load balancer can provide a CGO in which the identifiers of the peers that cache the specified file are sorted based on measures of caching load/activity of the respective peers referenced by the CGO.

At 210', a caching load and activity is monitored across the peers of the P2P-based NFS. The caching load refers to caching inventories at each of the peers of the P2P-based NFS, and caching activity refers to rates of file additions, evictions or both at each of the peers of the P2P-based NFS. The information collected as part of the monitoring is maintained by the cluster associated with the caching load balancer. The information about caching load and activity at the peers of the P2P-based NFS can be collected by the cluster through communications with the peers of the P2P-based NFS. As described above in connection with FIG. 1A, the communications between the cluster associated with the caching load balancer and the peers of the P2P-based NFS application can be carried out via an API.

For example, at 240, a notification from the requesting peer that the specified file was retrieved from a first peer referenced by the provided information can be received by the cluster associated with the caching load balancer. At 250, a caching activity at the first peer can be updated, by the cluster associated with the caching load balancer, in accordance with the received notification. This caching activity update includes recording that the first peer has served the specified file to the requesting peer.

As another example, at 245, a notification from the requesting peer that the specified file was retrieved from a second peer referenced by the provided information because a first peer referenced by the provided information did not cache the specified file can be received by the cluster associated with the caching load balancer. At 255, a caching activity at the second peer can be updated, by the cluster associated with the caching load balancer, in accordance with the received notification. This caching activity update includes recording that the second peer has served the specified file to the requesting peer. At 260, a caching load at the first peer can be updated, by the cluster associated with the caching load balancer, in accordance with the received notification. This caching load update includes recording that the first peer has evicted (and now is not caching) the specified file.

Additionally, at 270, a caching load at the requesting peer can be updated, by the cluster associated with the caching load balancer, in accordance with the notification received either at 240 or at 245. This caching load update includes recording that the requesting peer has added (and now is caching) the specified file. The updates at 250, 255, 260 and 270 are performed by the caching load balancer as part of 210' to maintain information about the files cached across the peers of the P2P-based NFS.

Figure 3:
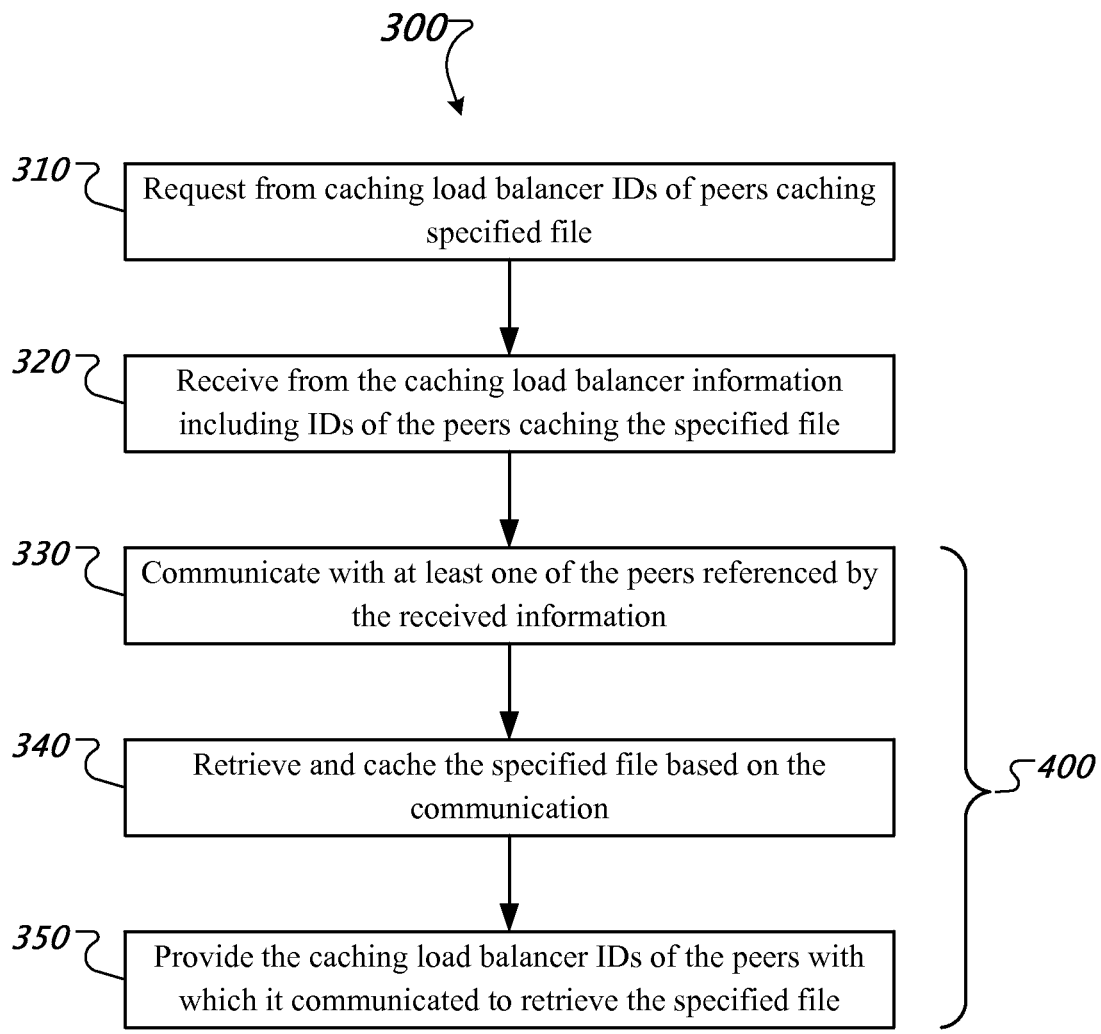
FIG. 3 shows aspects of an example of a process performed by a P2P client of a NFS that includes a caching load balancer.

FIG. 3 shows aspects of an example of a process 300 performed by a P2P client of a P2P-based NFS that includes a caching load balancer. The P2P-based NFS can include three or more P2P clients configured to cache data associated with the P2P-based NFS, as described above in connection with FIGS. 1A, 1E and 1G. For example, the P2P clients (also referred to as peers) included in the P2P-based NFS can correspond to the devices described above in connection with FIGS. 1B, 1C and 1F. The caching load balancer is communicatively coupled with the peers of the P2P-based NFS. Examples of functional implementations of the caching load balancers were described above in connection with FIGS. 1A, 1E, 1G and 2.

At 310, in response to detecting that a specified file is not cached at a peer, the peer requests, from a caching load balancer associated with the P2P-based NFS, information that identifies one or more other peers of the P2P-based NFS that cache the specified file. In the example illustrated in FIG. 1A, the P2P NFS client 110-1 transmits the request "A" to the caching load balancer 120 for the identities of ones of the P2P NFS clients 110-1, 110-2, . . . that cache the specified file Fj.

At 320, the peer receives, from the caching load balancer, a response including information identifying one or more other peers of the P2P-based NFS that cache the specified file. In the example illustrated in FIG. 1A, the P2P NFS client 110-1 receives the response "B", from the caching load balancer 120, that includes the CGO 130 identifying the P2P NFS clients 110-2, 110-3 and 110-5 that cache the specified file Fj.

At 330, the peer communicates with at least one of the other peers of the P2P-based NFS referenced by the response received from the caching load balancer to retrieve the specified file. In the example illustrated in FIG. 1A, the P2P NFS client 110-1 selects the P2P NFS client 110-3 referenced by the CGO 130 received from the caching load balancer 120, and then transmits the request "C" to the selected P2P NFS client 110-3 for the specified file Fj.

At 340, the peer retrieves and locally caches the specified file based on the communication with the at least one of the peers of the P2P-based NFS referenced by the response received from the caching load balancer. In the example illustrated in FIG. 1A, the P2P NFS client 110-1 receives the response "D", from the P2P NFS client 110-3, that includes the specified file Fj. Other possible responses received by the P2P NFS client 110-1 from the P2P NFS client 110-3 or other of the P2P NFS clients referenced by the CGO 130 are described in this specification in connection with FIGS. 1A and 4.

At 350, the peer provides, to the caching load balancer, a notification including (i) an identity of the at least one of the other peers referenced by the response received from the caching load balancer with which the peer has communicated to retrieve the specified file, and (ii) a confirmation that the specified file is now cached at the peer. In the example illustrated in FIG. 1A, the P2P NFS client 110-1 transmits the notification "E" to the caching load balancer 120 to identify P2P NFS client 110-3 from which the P2P NFS client 110-1 obtained the specified file Fj, and to confirm that the specified file Fj is now cached at the P2P NFS client 110-1. Other possible notifications sent by the P2P NFS client 110-1 to the caching load balancer 120 are described in this specification in connection with FIGS. 1A and 4.

Figure 4:
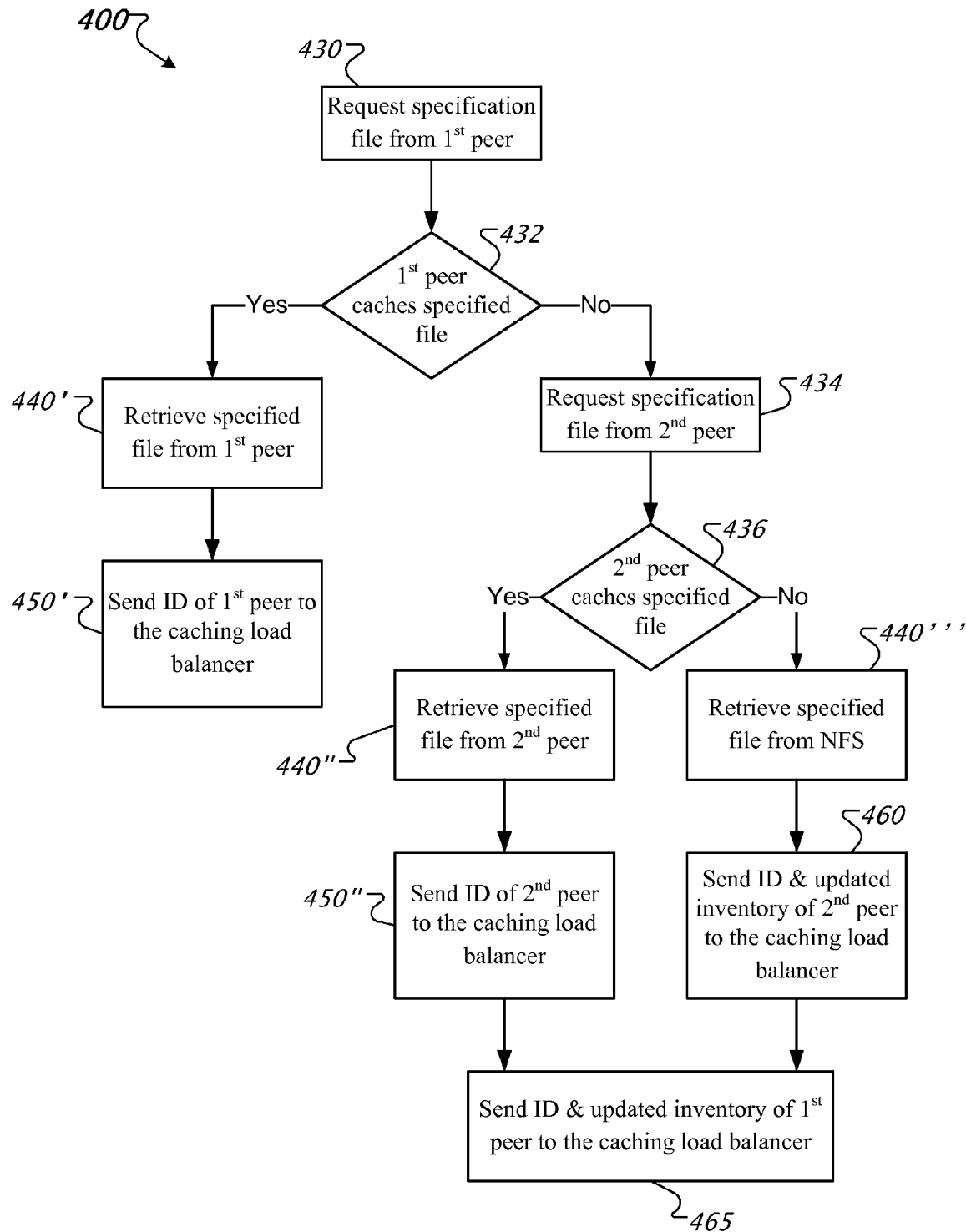
FIG. 4 shows other aspects of the example of the process described in connection with FIG. 3.

FIG. 4 shows aspects of another example of a process 400 performed by a P2P client of a P2P-based NFS that includes a caching load balancer. In some implementations, the process 400 can correspond to aspects of the process 300 described in above connection with FIG. 3. For example, the process 400 can be performed by a peer of the P2P-based NFS that has received from the caching load balancer information identifying two or more other peers of the P2P-based NFS that cache a specified file. The information received from the caching load balancer also can include permission information associated with instances of the specified file that are cached at the identified two or more peers of the P2P-based NFS. In some implementations, the information received from the caching load balancer can include respective caching loads of the identified two or more devices.

At 430, the peer requests, from a first peer of the P2P-based NFS referenced by the information received from the caching load balancer, to retrieve the specified file. The requesting peer can select the first peer for retrieving the specified file based on a permission associated with an instance of the specified file cached the at first peer meeting a given permission. The given permission corresponds to a given action, e.g., a read, write or lock operation, which an application running at the peer needs to perform once the application accesses the specified file. In some implementations, the peer can select the first peer for retrieving the specified file based on a communication channel between the peer and the first peer being less than a predefined quantity of network hops. In some implementations, the peer can select the first peer for retrieving the specified file based on a caching load/activity level of the first peer being less than a predefined level.

At 432, the requesting peer determines whether the first peer caches the specified file. The determination can be made based on a response received from the first peer. If the response received from the first peer specifies that the first peer currently caches the specified file, at 440', the requesting peer retrieves the specified file from the first peer. At 450', the requesting peer provides to the caching load balancer the identifier of the first peer with which the requesting peer has communicated to retrieve the specified file.

If the response received from the first peer specifies that the first peer currently misses the specified file, at 434, the peer requests, from a second peer of the P2P-based NFS referenced by the information received from the caching load balancer, to retrieve the specified file. The second peer can be selected by the requesting peer based on similar criteria described above in connection with the selection of the first peer. At 436, the requesting peer determines whether the second peer caches the specified file. The determination can be made based on a response received from the second peer. If the response received from the second peer specifies that the second peer currently caches the specified file, at 440", the requesting peer retrieves the specified file from the second peer. At 450", the requesting peer provides to the caching load balancer the identifier of the second peer with which the requesting peer has communicated to retrieve the specified file. If the response received from the second peer specifies that the second peer currently misses the specified file, the requesting peer can request the specified file from one or more of the remaining other peers of the P2P-based NFS referenced by the information received from the caching load balancer, in accordance with 434 and 436.

For illustrative purposes, in FIG. 4, the information received from the caching load balancer references only the first and second peers. In this case, if the response received from the second peer specifies that the second peer currently misses the specified file, at 440''', the requesting peer retrieves the specified file from a network file server of the NFS. At 460, the requesting peer sends the caching load balancer the identifier of the second peer and a notification that the specified file is missing at the second peer. Additionally, whether the requesting peer retrieves (at 440'' or at 440''') the specified file from the second peer or from the network file server, at 465, the requesting peer sends the caching load balancer the identifier of the first peer and a notification that the specified file is missing at the first peer.

Once the specified file has been retrieved by the requesting P2P client and cached locally, applications running at the P2P client can perform desired operations on the specified file. In some implementations, the specified file can be evicted from the local cache of the P2P client when the specified file is left idle for more than a predefined period of time. In other implementations, the specified file can be evicted from the local cache of the P2P client, even before the predefined period of time has elapsed, to make room for caching another more recently retrieved file.

However, the P2P client may need to re-obtain and cache the specified file again at a later time. To do so, the P2P client can perform once again the process 300 described above in connection with FIG. 3. As a result of the bidirectional communication 310, 320, the requesting P2P client receives, from the caching load balancer associated with the P2P-based NFS, information identifying one or more other peers of the P2P-based NFS that currently cache the specified file. Once in possession of this information, the requesting P2P client can perform the remaining communications of the process 300 or the communications of the process 400 to re-obtain the specified file based on the information received from the caching load balancer.

Figure 5A:
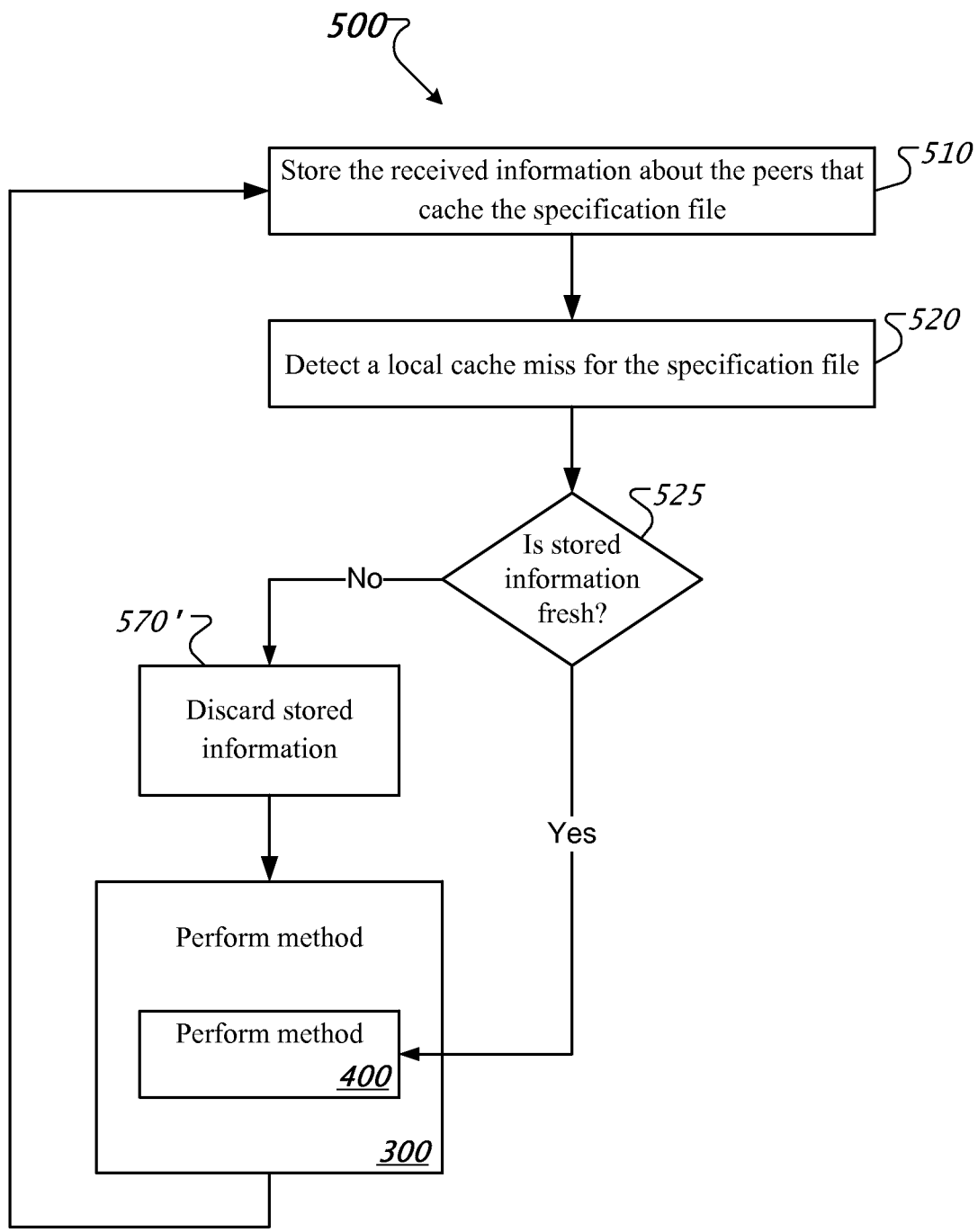
FIGS. 5A and 5B show aspects of another example of a process performed by a P2P client of a NFS that includes a caching load balancer.
Figure 5B:
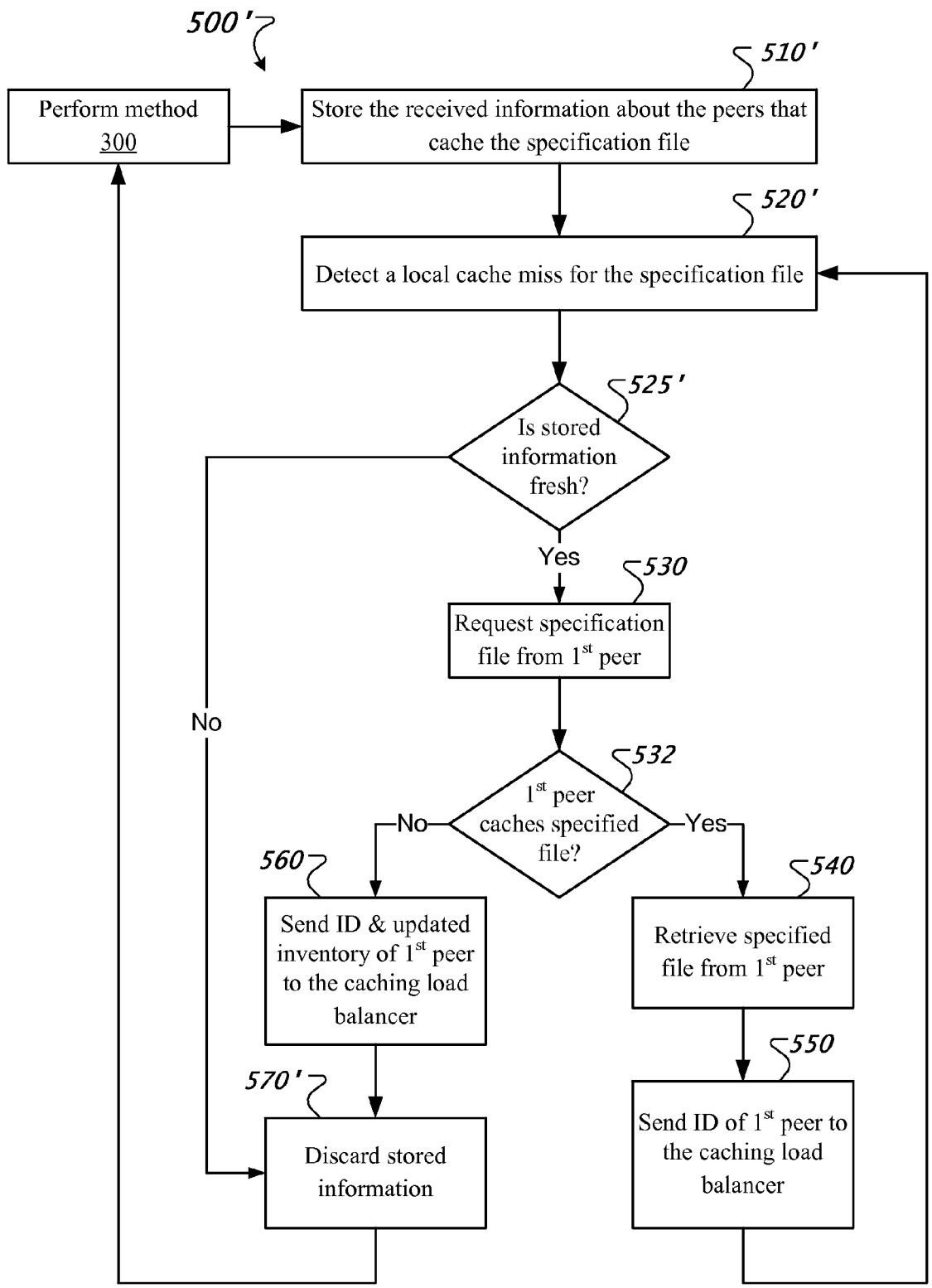

FIGS. 5A and 5B show aspects of other examples of processes 500 and 500' performed by a P2P client of a P2P-based NFS that includes a caching load balancer. The processes 500 and 500' can be performed by the P2P client to accelerate the process of re-obtaining the specified file cached at other P2P clients of the P2P-based NFS. The processes 500 and 500' of re-obtaining the specified file rely on (i) storing the information identifying one or more other peers that cache the specified file, as received from the caching load balancer in response to a previous request, and (ii) reusing the stored information. In this fashion, the bidirectional communication 310, 320 need not be executed for re-obtaining the specified file, as described below.

At 510 and 510', the information identifying one or more other peers that cache the specified file, as received from the caching load balancer in response to a previous request, is saved by a peer of the P2P-based NFS. In the example illustrated in FIG. 1A, the CGO 130 is received by the requesting P2P NFS client 110-1 from the caching load balancer 120 as a result of the bidirectional communication (A, B). The received CGO 130 identifies P2P NFS clients 110-2, 110-3 and 110-5 as caching the specified file Fj. In accordance with processes 300 and 400, and as described above in connection with FIG. 1A, the information included in the CGO 130 can be used by the P2P NFS client 110-1 to retrieve the specified file from one of the P2P NFS clients 110-2, 110-3 and 110-5 that were identified as caching the specified file Fj. In accordance with the processes 500 and 500', the CGO 130 can be saved by the P2P NFS client 110-1 and reused later to re-obtain the specified file Fj.

Note that besides saving the information identifying one or more other peers that cache the specified file, the peer can save information identifying one or more other peers that cache another specified file. In some implementations, for each one of multiple files to be retrieved and cached at the peer, the peer can save the latest information received from the caching load balancer identifying one or more other peers that cache the one of the multiple files. In the example illustrated in FIG. 1A, the received CGO 130 identifies P2P NFS clients caching the specified file Fj. Another CGO 130' can identify P2P NFS clients caching another specified file Fk, and so on. In accordance with the processes 500 and 500', the CGO 130 can be saved by the P2P NFS client 110-1 and reused later to re-obtain the specified file Fj; the CGO 130' can be saved by the P2P NFS client 110-1 and reused later to re-obtain the specified file Fk; and so on.

At 520 and 520', a cache miss for the specified file is detected by the P2P peer that stores the information previously received from the caching load balancer. The cache miss for the specified file can be detected if the P2P peer has evicted the previously cached specified file. In the example illustrated in FIG. 1A, the P2P NFS client 110-1 has evicted the previously cached specified file Fj. Under such circumstances, the P2P NFS client 110-1 detects a cache miss when an application running at the P2P NFS client 110-1 needs to access the specified file Fj.

At 525 and 525', the P2P peer that stores information previously received from the caching load balancer determines whether the stored information associated with the specified file is fresh. The determination can be made based on comparing a time the information was locally stored against a predefined time. The predefined time can be predetermined, e.g., 10 sec, 60 sec, 600 sec, etc. Alternatively, the predefined time can be determined programmatically. For example, if a caching activity level at the peer is high, e.g., the peer experiences file additions, evictions or both at a frequency larger than 1 addition/eviction per minute, then the predefined time can be short, e.g., 10 sec; else, if the caching activity level at the peer is low, e.g., the peer experiences file additions, evictions or both at a frequency lower than 1 addition/eviction per 1 hour, then the predefined time can be long, e.g., 600 sec. As such, if the information has been stored for longer than the predefined time, then the stored information is deemed stale, otherwise the stored information is considered fresh.

If the peer that stores the information previously received from the caching load balancer determines that the stored information associated with the specified file is stale, at 570 and 570', the peer discards the stored information associated with the specified file. In the example illustrated in FIG. 1A, the P2P NFS client 110-1 can discard the stale CGO 130 that identifies P2P NFS clients caching the specified file Fj. At this stage, the peer can proceed to re-execute the process 300, as described above in connection with FIG. 3. By doing so, the peer can receive from the caching load balancer new information identifying one or more other peers that currently cache the specified file and can re-obtain the specified file from one of the other peers identified by the received new information. Subsequently, the peer can re-execute the processes 500 or 500', starting at 510 or 510', to store and reuse in the future the new information associated with the specified file, as received from the caching load balancer, for re-obtaining the specified file.

If the peer that stores the information previously received from the caching load balancer determines that the stored information associated with the specified file is fresh, in accordance with the process 500 illustrated in FIG. 5A, the peer can proceed to re-execute the process 400, as described above in connection with FIG. 4. By doing so, the peer can reuse the stored information identifying one or more other peers caching the specified file and can re-obtain the specified file from one of the other peers identified by the stored information. In the example illustrated in FIG. 1A, the P2P NFS client 110-1 can perform process 400 using information from the still fresh CGO 130 that identifies P2P NFS clients caching the specified file Fj. Subsequently, the peer can re-execute the process 500, starting at 510, to continue to store and to reuse in the future the stored information associated with the specified file for re-obtaining the specified file.

If the peer that stores the information previously received from the caching load balancer determines that the stored information associated with the specified file is fresh, in accordance with the process 500' illustrated in FIG. 5B, the peer can request, at 530, from a first peer of the P2P-based NFS referenced by the information stored by the peer, to retrieve the specified file. At 532, the requesting peer determines whether the first peer caches the specified file. The determination can be made based on a response received from the first peer. If the response specifies that the first peer currently caches the specified file, at 540, the requesting peer retrieves the specified file from the first peer. At 550, the requesting peer provides to the caching load balancer the identifier of the first peer with which the requesting peer has communicated to retrieve the specified file. Subsequently, the peer can re-execute the process 500', starting at 520', to reuse in the future the stored information associated with the specified file for re-obtaining the specified file.

If the response specifies that the first peer currently misses the specified file, at 560, the requesting peer sends the caching load balancer the identifier of the first peer and a notification that the specified file is missing at the first peer. At 570', the peer discards the stored information associated with the specified file. At this stage, the peer can re-execute the process 300, as described above in connection with FIG. 3. By doing so, the peer can receive from the caching load balancer new information identifying one or more other peers that currently cache the specified file and can re-obtain the specified file from one of the other peers identified by the received new information. Subsequently, the peer can re-execute the process 500', starting at 510', to store and reuse in the future the new information associated with the specified file, as received from the caching load balancer, for re-obtaining the specified file.

It was described above in connection with FIG. 1A that the caching load balancer 120 can use information collected from communications with the P2P NFS clients 110-1, 110-2, ... to maintain records about temporal and spatial patterns for caching of a given file or caching activity at a certain P2P NFS client. In addition to the foregoing patterns, the caching load balancer 120 can keep track of locally stored information (e.g., CGOs) usage either by file or by P2P NFS client. For example, the caching load balancer 120 can track the P2P NFS clients that are frequent users of locally stored CGOs associated with a specified file. As another example, the caching load balancer 120 can track files for which associated CGOs are most frequently stored at a given P2P NFS client. Information related to current or historical use of locally stored information, also can be used by the caching load balancer 120 to adaptively coordinate caching of files across the P2P clients 110-1, 110-2, ... of the NFS 100.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
a cluster comprising two or more computer systems, the cluster being communicatively coupled with a network that includes three or more computer systems configured to cache data associated with a file server system, each of the two or more computer systems of the cluster is configured to the network, maintain information about files cached at the three or more computer systems of receive, from one of the three or more computer systems of the network, a request to identify at least one computer system of the network that caches a specified file, identify, in response to the received request, one or more computer systems of the network, other than the requesting computer system, that cache the specified file based on the maintained information, and provide, to the requesting computer system, information referencing at least the identified one or more computer systems of the network, where each of the two or more computer systems of the cluster is further configured to monitor caching load of each of the three or more computer systems of the network, and in response to the provided information referencing multiple computer systems of the network that cache the specified file, prioritize the provided information based on respective caching loads of the multiple computer systems referenced by the provided information.

2. The system of claim 1, where at least one computer system of the cluster is part of the network that includes the three or more of the computer systems configured to cache the data associated with the file server system.

3. The system of claim 2, where all computer systems of the cluster are part of the network that includes the three or more of the computer systems configured to cache the data associated with the file server system.

4. The system of claim 2, where the requesting computer system is not included in the two or more computer systems of the cluster.

5. The system of claim 1, where the provided information referencing at least the identified one or more computer systems of the network includes permission information associated with an instance of the specified file that is cached at the identified one or more computer systems of the network.

6. The system of claim 1, where each of the two or more computer systems of the cluster is further configured to receive from the requesting computer system a notification that the specified file was retrieved from a first computer system referenced by the provided information, and update the maintained information in accordance with the received notification, the update relating to caching load at the requesting computer system and to caching activity at the first computer system.

7. The system of claim 1, where each of the two or more computer systems of the cluster is further configured to receive from the requesting computer system a notification that the specified file was absent at a first computer system referenced by the provided information and that the specified file was retrieved from a second computer system referenced by the provided information, and update the maintained information in accordance with the received notification, the update relating to respective caching loads at the requesting computer system and at the first computer system, and to caching activity at the second computer system.

8. The system of claim 1, where the cluster has a single identifier to be used by the three or more computer systems of the network that are not part of the cluster, and each of the two or more computer systems of the cluster is further configured to respond to the request based on recognition of the single identifier.

9. A method comprising:

maintaining, by a cluster comprising two or more computer systems, information about files cached at a network that includes three or more computer systems configured to cache data associated with a file server system;

receiving, by the cluster from one of the three or more computer systems of the network, a request to identify at least one computer system of the network that caches a specified file;

identifying, by the cluster in response to the received request, one or more computer systems of the network, other than the requesting computer system, that cache the specified file based on the maintained information; and providing, by the cluster to the requesting computer system, information referencing at least the identified one or more computer systems of the network, monitoring, by the cluster, caching load of each of the three or more computer systems of the network, and prioritizing, by the cluster in response to the provided information referencing multiple computer systems of the network that cache the specified file, the provided information based on respective caching loads of the multiple computer systems referenced by the provided information.

10. The method of claim 9, wherein at least one computer system of the cluster is part of the network that includes the three or more of the computer systems configured to cache the data associated with the file server system.

11. The method of claim 10, wherein all computer systems of the cluster are part of the network that includes the three or more of the computer systems configured to cache the data associated with the file server system.

12. The method of claim 10, wherein the requesting computer system is not included in the two or more computer systems of the cluster.

13. The method of claim 9, where the provided information referencing at least the identified one or more computer systems of the network comprises permission information associated with an instance of the specified file that is cached at the identified one or more computer systems of the network.

14. The method of claim 9, comprising:

receiving, by the cluster from the requesting computer system, a notification that the specified file was retrieved from a first computer system referenced by the provided information, and updating, by the cluster, the maintained information in accordance with the received notification, the update relating to caching load at the requesting computer system and to caching activity at the first computer system.

15. The method of claim 9, comprising:

receiving, by the cluster from the requesting computer system, a notification that the specified file was absent at a first computer system referenced by the provided information and that the specified file was retrieved from a second computer system referenced by the provided information, and updating, by the cluster, the maintained information in accordance with the received notification, the update relating to respective caching loads at the requesting computer system and at the first computer system, and to caching activity at the second computer system.

16. The method of claim 9, wherein the cluster has a single identifier to be used by the three or more computer systems of the network that are not part of the cluster, and the method comprises responding, by the cluster, to the request based on recognition of the single identifier.

* * * * *